(12) United States Patent
Jarvis, III et al.

(10) Patent No.: US 11,536,553 B2
(45) Date of Patent: Dec. 27, 2022

(54) STRUCTURAL COMPONENT FINDER DEVICE AND METHOD OF USE

(71) Applicants: Francis Geering Jarvis, III, San Diego, CA (US); Luke Francis Jarvis, San Diego, CA (US)

(72) Inventors: Francis Geering Jarvis, III, San Diego, CA (US); Luke Francis Jarvis, San Diego, CA (US)

(*) Notice: Subject to any disclaimer, the term of this patent is extended or adjusted under 35 U.S.C. 154(b) by 578 days.

(21) Appl. No.: 16/578,065

(22) Filed: Sep. 20, 2019

(65) Prior Publication Data

US 2020/0256658 A1 Aug. 13, 2020

Related U.S. Application Data

(63) Continuation-in-part of application No. PCT/US2017/053042, filed on Sep. 22, 2017.

(60) Provisional application No. 62/486,315, filed on Apr. 17, 2017.

(51) Int. Cl.
| | | |
|---|---|---|
| *G06F 17/10* | (2006.01) | |
| *G01B 5/00* | (2006.01) | |
| *G01V 11/00* | (2006.01) | |
| *G01B 3/28* | (2006.01) | |

(52) U.S. Cl.
CPC ............ *G01B 5/0004* (2013.01); *G01B 3/28* (2013.01); *G01V 11/00* (2013.01)

(58) Field of Classification Search
CPC ......... G01B 3/28; G01B 5/0004; G01V 11/00
USPC ........................................ 703/1, 2; 33/542.1
See application file for complete search history.

(56) References Cited

U.S. PATENT DOCUMENTS

| | | | | |
|---|---|---|---|---|
| 4,329,783 A | * | 5/1982 | Maresca ................. | E04D 15/00 33/542 |
| 2011/0025293 A1 | * | 2/2011 | Tweedie .................... | G01V 9/00 324/67 |

* cited by examiner

*Primary Examiner* — Andre Pierre Louis
(74) *Attorney, Agent, or Firm* — FisherBroyles, LLP; Thomas J. Osborne, Jr.

(57) ABSTRACT

The present disclosure relates to the field of tools and more particularly to tools used for locating non-visible structural elements. In specific embodiments, the tools are used to locate non-visible structural elements, such as under a roof or behind a wall.

28 Claims, 31 Drawing Sheets

STRUCTURAL COMPONENT FINDER DEVICE AND METHOD OF USE

CROSS-REFERENCE TO RELATED APPLICATIONS

This application is a continuation-in-part of PCT application PCT/US17/53042 filed on Sep. 22, 2017, which claims priority to U.S. Provisional Patent Application 62/486,315, filed on Apr. 17, 2017. Each of the applications is hereby incorporated by reference in its entirety as if fully set forth herein.

FIELD

The present disclosure relates to the field of tools and more particularly to tools used for locating non-visible structural members. In specific embodiments, the tools are used to locate non-visible structural members behind a surface, such as but not limited to a roof, wall or floor.

BACKGROUND

The installation of solar panels on roofs has increased significantly in the past few years, and that trend is expected to continue into the foreseeable future. As competition grows in this field, installers are always looking for ways to increase efficiency. One of the biggest problems that installers face is quickly and accurately finding the center of the rafters on the roofs where they attach the mounts for the solar panels. To ensure the strength of the system installed, solar mount manufacturers require the mounting lag screws be located within the middle ⅓ of the 1½" wide rafter. This requirement is the same for any attachment to a stud or rafter that is supporting any type of weight, such as shelving or other heavy fixtures. Henceforth, the terms "structural component/member," "stud," and "rafter" will be used interchangeably or chosen depending upon the situation being discussed, with "studs" specifically found in walls and "rafters" specifically found in roofs; in any case, the centerlines of these structural components is what is being located.

Depending on the project, the size of the screw used varies. For example, a 5/16" lag screw can be used to secure the mount, which means the screw must be placed within 3/32" of the center of the rafter. Since the rafters are located underneath at least one layer of shingles, paper, and plywood, finding the center of the rafter can be very challenging. This is made even more difficult due to the fact that many roofs may have multiple layers of wood and/or shingles, along with some mounts that require two lag bolts which means you need two center locations per mount to make a line describing the center of the rafter. All of this takes time and, in a labor-intensive field like solar installation, time is very valuable.

The electronic stud finders currently on the market are substantially limited in their capabilities, as they are not effective on surfaces such as a roof, where there are various layers of different materials including wood, shingles, and tar paper. These stud finders typically require a smooth, homogenous surface like drywall to work correctly, so uneven, multi-layered surfaces render them impractical.

The magnetic stud finders currently on the market identify nails that are presumed to be located along wall studs inside of a house, and try to use this information to subsequently locate the placement of these wall studs. However, further probing is needed to find the exact centerline of the stud, as there is no way of knowing where in the stud the nails are located. Magnetic stud finders are also ineffective on a roof, where there are three sets of nails: one to hold the plywood to the rafters, one for the roofing paper, and one for the shingles. The magnets have no way to differentiate between the different sets of nails and are therefore ineffective in locating the centerline of the rafters.

There are a few mechanical stud finders in existence, but they are time consuming and only find the edge of the stud in one location. When locating rafters on a roof, workers use a form of crayon to mark the edge of a rafter once they have located it; these marks typically measure about 2/16" wide. The worker must then measure in from this mark and create another mark to find the center of the rafter. This additional step takes even more time and is a second opportunity to make an error in locating the center, since workers may still be unclear as to where to measure from on the 2/16" wide mark itself. When you need to be accurate within 3/16" and your marks are 2/16" wide, every step increases your chances of being outside of the parameters and therefore beyond the middle third of the rafter as is recommended, compromising the structural integrity of any attachment being made. When a mount requires two lag screws, this process must be repeated a second time and, as previously mentioned, further exposes opportunities for error.

One example of these mechanical stud finders is discussed in U.S. Pat. No. 2,992,488, in which a hole is drilled through the surface next to the stud and a hollow tube bent to ninety degrees is placed into the hole with the open end pointed towards the stud being sought. A wire is then pushed into and through the tube until it is stopped by hitting the edge of the stud, at which point the wire is marked, removed, and measured; this measurement is used to find the edge of the stud relative to the hole. From this point, another measurement is made to find the center of the rafter. Another example is found in U.S. Pat. No. 4,329,783, which discloses a device that involves drilling a hole through the surface at an angle next to the stud and then inserting a rod through the hole until it contacts the side of the stud. At this point, similar to the previous patent, it is marked and used as a reference to measure from the hole to the edge of the stud, and, as in the previously mentioned patent, a second measurement is made to locate the center of the rafter.

The mechanical stud finder detailed in U.S. Pat. No. 8,234,791 shows a device wherein a hole is drilled through the surface next to the stud. A probe is then inserted into the hole until the base is seated on the surface, at which point it is rotated until the probe contacts the side of the stud under the surface. The device has a member on top of the surface that indicates the position of the probe under the surface, so that when the probe contacts the side of the stud being located, and, providing that the surface the device is resting on is exactly perpendicular to the side of the hidden stud member, the edge of the hidden stud member can be marked as indicated by the device. It should be noted that the surface that the support block of this device is seated on when in use must be perpendicular to the side of the stud or rafter being located; otherwise, the accuracy of the device is compromised. When working on surfaces such as roofs where there can be multiple layers of wood, paper, or shingles that can add an angle (typically 4-5 degrees) to the underlying surface, a surface perpendicular to the side of the rafters is not always available. As with the two previously mentioned patents, once the edge of the stud is located, a measurement must then be taken from this mark to determine the location of the center of the hidden stud.

The high likelihood of inaccuracy due to having to make multiple precise measurements and/or uneven surfaces to find the centerline of a hidden rafter makes it clear why the preferred method for the industry is to drill multiple holes until you find the edge of the rafter and then measure from there to get the center, wasting valuable time in the process. Further, since these devices locate the edge of the rafter and not the center, they are more useful for projects where users would need to avoid the rafter instead of securing an attachment to it (e.g. installing a window or skylight). Therefore, they are inefficient for quickly and accurately locating the centerline of a hidden rafter which is necessary when installing any sort of structural attachment (e.g. solar mounts).

Based on the foregoing, there exists a need for a fast, accurate, and inexpensive device to locate the centerline of a stud or rafter behind a surface which may be angled and uneven. The invention described herein fulfills this need.

SUMMARY

In various embodiments, provided herein is a device to locate the centerline of a hidden structural component comprising: a locating member and an indicator key directly or indirectly coupled to the locating member.

In one embodiment, for example, a hidden structural component includes a locating member and an indicator key. The locating member may extend along a generally curved path coplanar to a vertical axis of the device and away from the vertical axis to a terminal end of the locating member. The indicator key can be directly or indirectly coupled to the locating member. In various embodiments, the indicator key comprises a post and a head coupled to the post. The head comprises an arcuate shape having a radius extending from a center point to a perimeter of the arcuate shape of the head. The terminal end of the locating member and the center point of the indicator key head have a generally coextensive relationship and the radius of the indicator key head extends beyond the terminal end of the locating member to extend beyond an edge of the structural member when the terminal end of the locating member is disposed adjacent to the hidden structural component in use.

In various embodiments, the main body of the device may comprise a grip; a midsection comprising a keyhole with a central axis, wherein the central axis passes directly through and perpendicular to the vertical axis of the main body; and a shank segment. In some embodiments, the grip, the midsection and the shank share a common vertical axis. In some embodiments, the shank is removable and interchangeable with shanks of different sizes to accommodate various hole sizes. In various embodiments, the main body comprises a lip. In some embodiments, the lip extends down and around the circumference of the base of the main body.

In various embodiments, the locating member may comprise a first segment comprising a first end and a second end; a second segment comprising a first end and a second end, the first end connected to the second end of the first segment; and a third segment comprising a first end and a second end. In some embodiments, the first end of the first segment of the locating member is connected to and extends down from the bottom of the main body along its vertical axis, passing through the center of the shank, and exiting from the bottom of the shank. In some embodiments, the first segment of the locating member extends sufficiently to insert the device through surfaces of varying thickness without having to enlarge the access hole.

In some embodiments, the second segment of the locating member curves along a path that is coplanar to the central axis of the keyhole and the vertical axis of the main body until it is substantially perpendicular to the vertical axis of the main body. In some embodiments, the first end of the third segment of the locating member is connected to the second end of the second segment of the locating member. In various embodiments, the third segment of the locating member extends perpendicular to and away from the vertical axis of the main body for a specific distance before it reaches the second end. In some embodiments, the path of the third segment of the locating member is coplanar to the first segment and second segment; and/or coplanar to the vertical axis of the main body; and/or coplanar to the central axis of the keyhole. In various embodiments, the second end of the third segment is the terminal end of the locating member.

In various embodiments, the indicator key may comprise a head having an arcuate shape (e.g., a semicircular, circular or other arcuate) shape. In some embodiments, a diameter of the head of the indicator key corresponds to ½ the thickness of a stud member being located. In some embodiments, the indicator key comprises an alignment pin calibration hole in the center of the radius of the head. In various embodiments, the center of the calibration hole is coextensive to the terminal end of the locating member when the indicator key is in its extended position. In some embodiments, the indicator key comprises a post having a first end and a second end, the post being straight and a specific length. In some embodiments, the length of the post of the indicator key is determined by the distance necessary to accurately align the alignment pin hole to the terminal end of the locating member.

In various embodiments, the post of the indicator key may have a thickness that allows it to perform its job and a cross sectional shape that allows it to be mounted by sliding into the main body's keyhole without rotating, and with slight interference to keep it in place when no force is applied to it. In some embodiments, the first end of the post on the indicator key is connected to the midpoint of the chord of the key head adjacent to the alignment pin hole; and the second end of the post of the indicator key has travel stops to keep the key from traveling completely through the keyhole opening of the main body while also lining up the indicator key head with the locating member when the device is in use.

In some embodiments, the indicator key post may have a cylindrical shape that allows the key to be rotated for storage when in the fully retracted position. In some embodiments, the post end of the indicator key is attached to the main body and made up of a flexible shape/material. In other embodiments, the post end comprises a flexible/spring coil. In alternate embodiments, the post end of the indicator key is attached to the main body such that it can be pivoted horizontally or vertically relative to the vertical axis of the main body. In some embodiments, the post end centers parallel to the third segment of the locating member.

In various embodiments, the alignment pin may have a first end and a second end. In some embodiments, the first end of the alignment pin has a semi-pointed tip that is aligned with (e.g., contacts) the terminal end of the locating member when in use to aid in calibration of the device; and the second end of the alignment pin has a bend or an enlarged diameter to stop the pin when it is inserted into the alignment pin hole located in the indicator key head to maintain calibration distance.

In some embodiments, the alignment hole may comprise a rim protruding from the alignment key to stabilize the alignment pin when in use. In some embodiments, the first end of the alignment pin is formed to aid in boring holes through a surface to insert the locating member. In other embodiments, the alignment pin is stored inside the indicator key. In some embodiments, the indicator key has an opening for storage of the alignment pin at the second end of the post.

Also provided herein, is a method for finding a location within a hidden structural component using a device described herein comprises: boring or otherwise creating an access hole at least generally perpendicular to and through the surface near the edge of a hidden stud member; retracting the indicator key; inserting the locating member and shank into the access hole until the bottom of the main body contacts the surface; extending the indicator key; rotating the device in either direction using a grip located on top of the main body until it stops; and marking a location (e.g., a point within a perimeter of, a point within a middle third of, or a center point of) the hidden structural member using the outer edge of the key head.

In some embodiments, the method of creating a line within a hidden structural component further comprises the steps of: rotating the device in the opposite direction of the first mark until it stops; using the outer edge of the indicator key to make a second mark on the center of the hidden stud member; and connecting the two marks to create a line within the hidden structural member (e.g., a center line or other line within a perimeter (e.g., within a middle third) of the hidden structural member).

In some embodiments, the calibrating step comprises the steps of: ensuring full vertical extension of the indicator key through the keyhole opening of the main body, where in the second end of the post of the indicator key is flush against the side of the main body.

In other embodiments, the calibrating step comprises the step of placing the alignment pin through the alignment hole in the indicator key head towards the terminal end of the locating member (e.g., until the second end of the pin is seated against the surface of the indicator key head).

In some embodiments, the calibrating step comprises the steps of confirming the tip of the alignment pin is aligned with (e.g., in contact with) the terminal end of the locating member.

Other objects, features and advantages of the compounds, methods and compositions described herein will become apparent from the following detailed description. It should be understood, however, that the detailed description and the specific examples, while indicating specific embodiments, are given by way of illustration only, since various changes and modifications within the spirit and scope of the instant disclosure will become apparent to those skilled in the art from this detailed description.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

Figure 1:
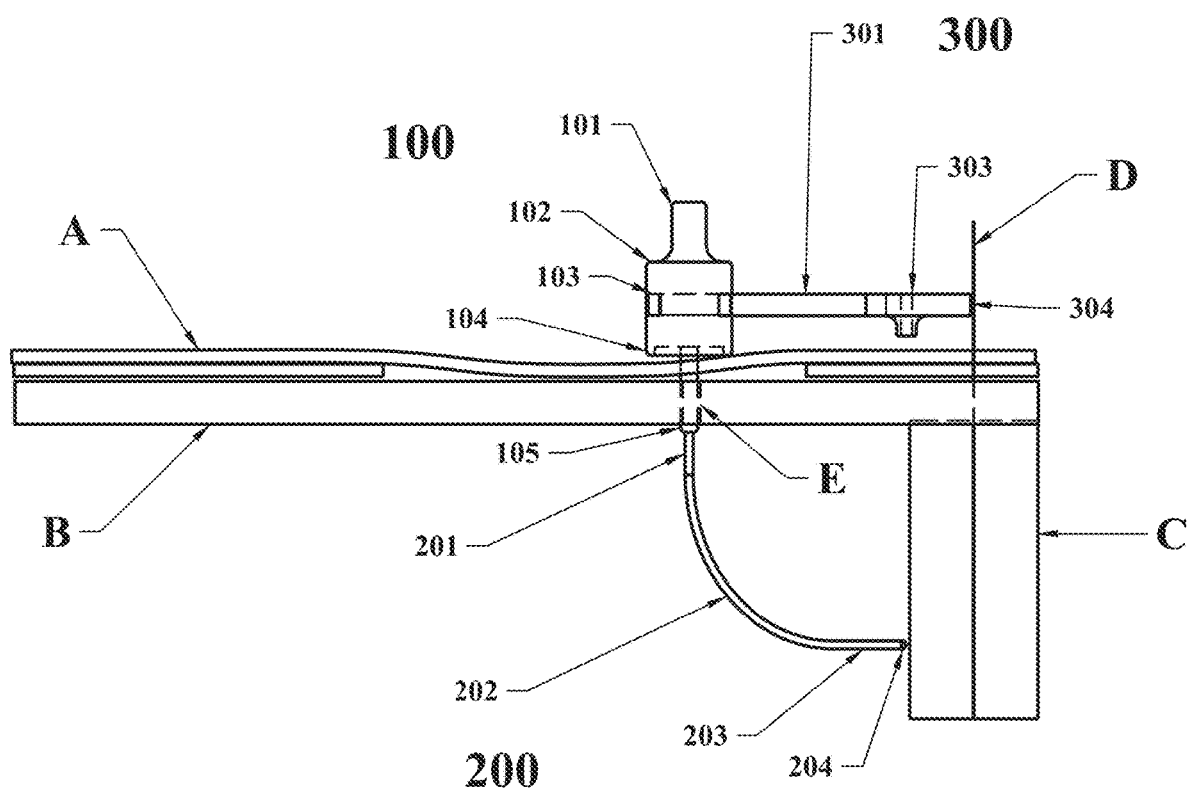
FIG. 1 is a side view of the structural component finder in use, according to an embodiment of the present invention.

Other objects, features and advantages of the compounds, methods and compositions described herein will become apparent from the following detailed description. It should be understood, however, that the detailed description and the specific examples, while indicating specific embodiments, are given by way of illustration only, since various changes and modifications within the spirit and scope of the instant disclosure will become apparent to those skilled in the art from this detailed description.

DETAILED DESCRIPTION

Specific illustrative embodiments of the present invention and their advantages may be understood by referring to FIGS. 1 to 11, wherein like reference numerals refer to like elements.

FIG. 1 illustrates the device being employed to locate the center D of a rafter or stud member C beneath a flat surface B and/or an uneven surface A. In operation, the user first bores an access hole E through shingle surface A and structural surface B next to said stud member C, with the hole being perpendicular to structural surface B and parallel to stud centerline D and main body vertical axis F. The location of said access hole E is near said stud member C as determined by the user. The diameter of the access hole E is sized to allow for the shank 105 to fit snugly in said access hole E and therefore holds the vertical axis F of main body 100 parallel to centerline D of stud C, regardless of any uneven surface A.

Using the device embodied in FIG. 1, the user can determine both the location and centerline D of a stud member C in an efficient and accurate manner regardless of a thick or uneven surface A. The device can be made out of any rigid or semi-rigid material, such as a polymer or metal.

Figure 3:
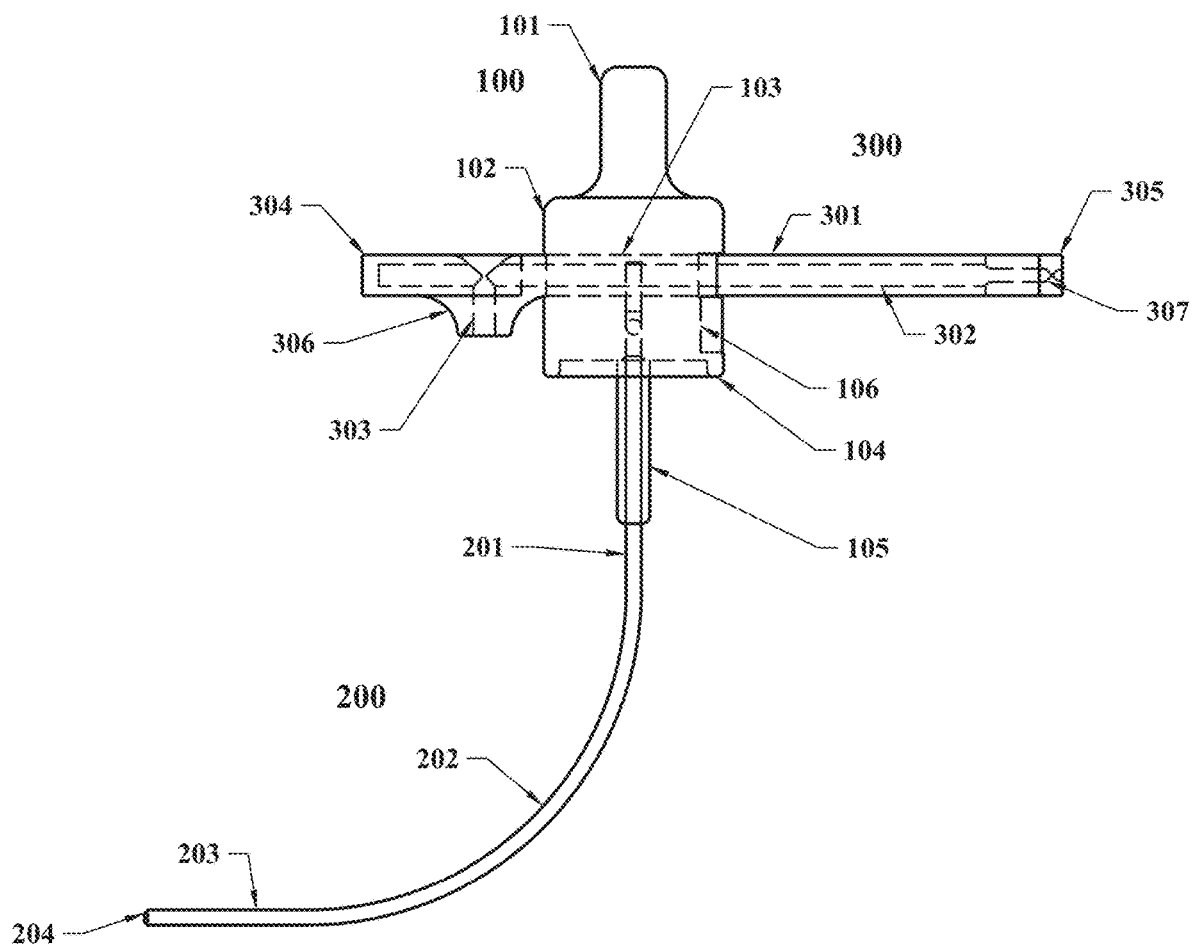
FIG. 3 is a side view of the structural component finder with indicator key removed, according to an embodiment of the present invention.

With the indicator key 300 in the retracted-position (as shown in FIG. 3), the locating member 200 is fed through the access hole E until the lip of the main body 104 contacts surface A. The indicator key 300 is then moved to the extended position (as shown in FIG. 1). The shank 105 width fits snugly within the access hole E so that the indicator key 300 and locating member end 203 are perpendicular to the stud member C despite the uneven surface A. User then rotates the main body grip 101, which corresponds to an equal rotation of the locating member 200 below the surfaces A and B. When rotation is no longer possible, the user knows that the terminal end of the locating member 204 has contacted the edge of stud member C (position illustrated in FIG. 1). The user would then use a marking utensil at the corresponding side of the indicator key head 304 relative to the edge of stud member C to mark the center D of said stud member C. The user is then able to attach a fastener to the center D of said stud member C based on the provided mark.

Figure 2:
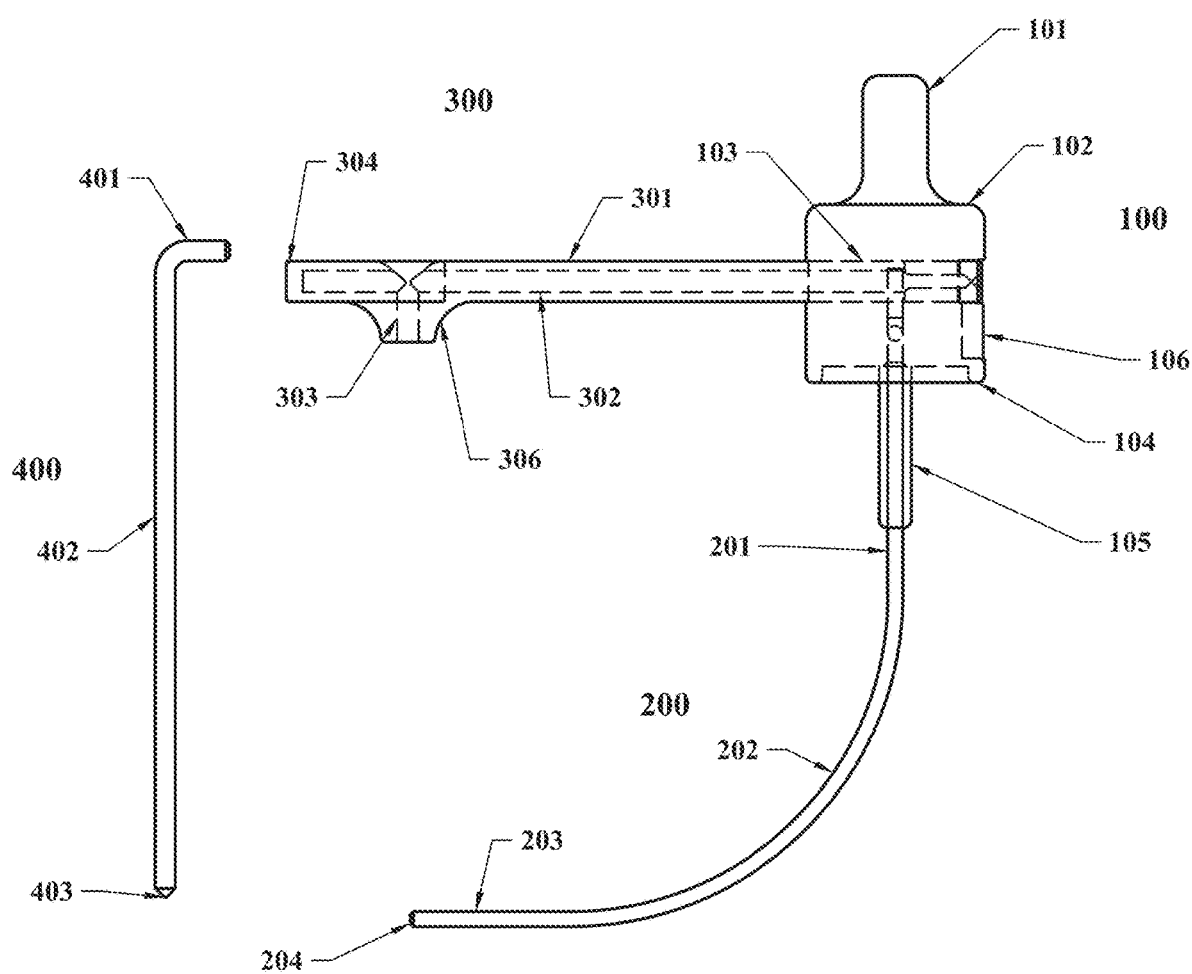
FIG. 2 is a side view of the structural component finder with alignment pin removed, according to an embodiment of the present invention.

FIG. 2 displays a comprehensive embodiment of the structural component finder device. The complete device comprises a body 100, a locating member 200, an indicator key 300, and an alignment pin 400. References to other figures will be made to explain design components.

In the embodiment illustrated in FIG. 3, the indicator key 300 is slidably engaged with the keyhole 103 allowing for the key to be extended and retracted to aid in the insertion of the locating member 200 in the access hole E or avoid contact with objects when the device is in use. When in the retracted position, the key post 301 would be pushed through keyhole 103 until the semicircular end of the indicator key touches the main body.

In another embodiment, a top portion of the post 301 of the indicator key 300 is rounded to allow said indicator key 300 to be rotated ninety degrees and laid flat for transportation or storage when the indicator key 300 is in the described retracted position.

Figure 4:
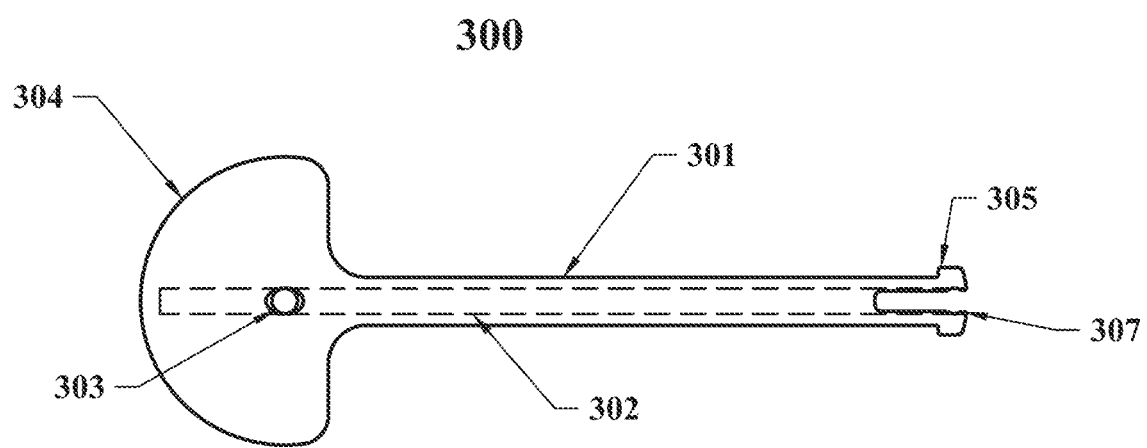
FIG. 4 is a side view of the indicator key component of the structural component finder showing alignment pin hole, alignment pin storage, and indicator key travel stops, according to an embodiment of the present invention.
Figure 5:
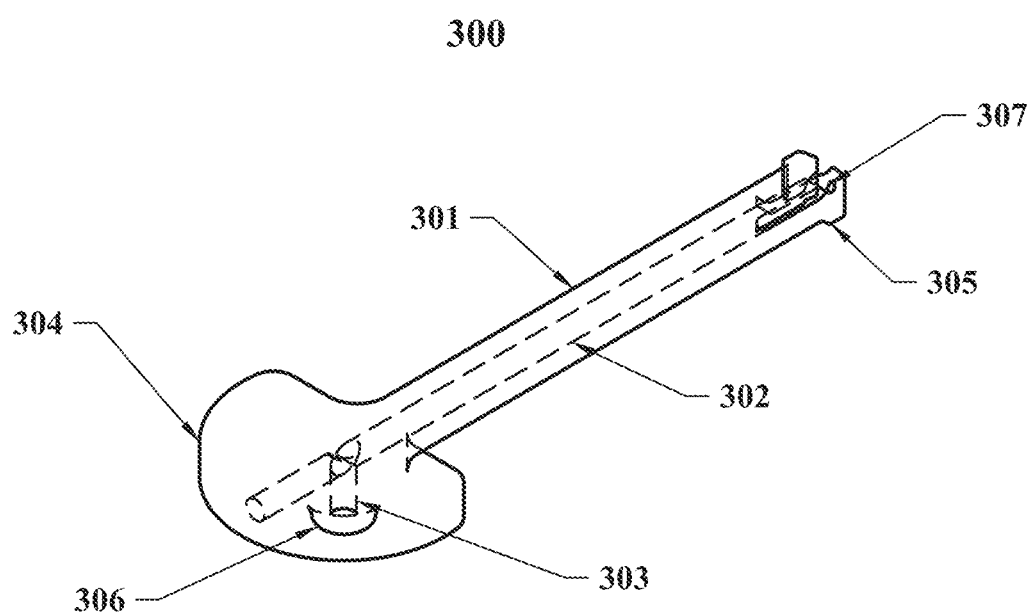
FIG. 5 is a perspective view of the indicator key component of the structural component finder, according to an embodiment of the present invention.
Figure 6:
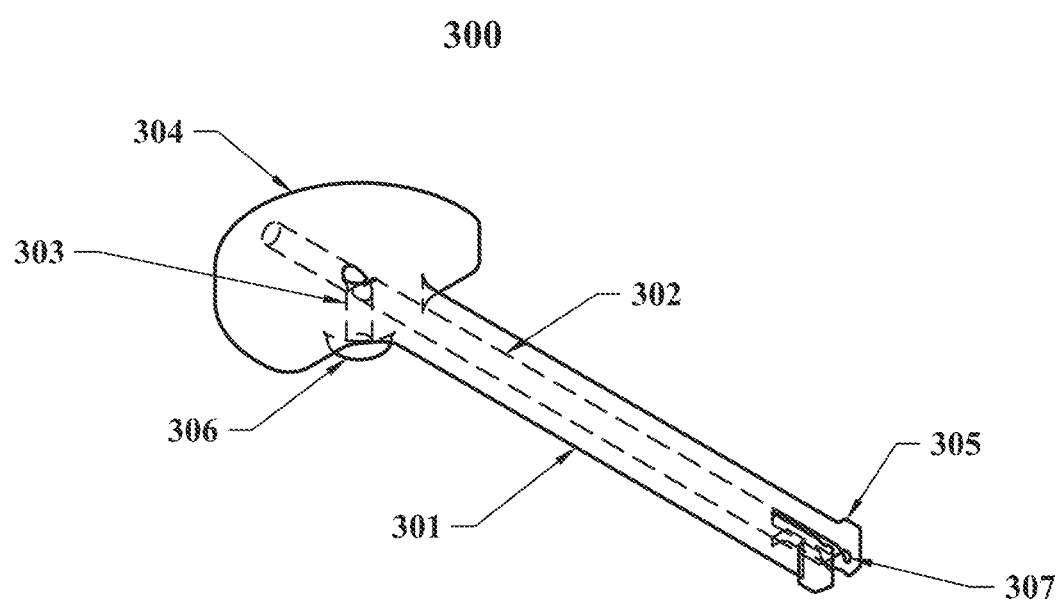
FIG. 6 is a perspective view of the indicator key component of the structural component finder, according to an embodiment of the present invention.

As illustrated in FIGS. 4 to 6, the indicator key 300 is comprised of a post 301 and a key head 304 that is attached to the post and is semicircular in form. In one embodiment, for example, the radius of the key head 304 is equal to half the width of the thickness of the stud member or rafter that is to be located. At the center of the key head, in this embodiment, is an alignment hole 303. The alignment hole 303 is positioned such that it is on the same vertical axis as the terminal end 204 of the locating member 200 and has a raised border 306 outlining the side of the hole directed towards the terminal end 204 of the locating member 200 to provide further stability and accuracy when calibrating the device. When not in use, the alignment pin 400 can be stored inside the key in slot 302, entering the base of the key at point 307. The base of key 307 can have travel stops 305 that act as a stop when key is fully extended out through keyhole opening 103 of body 100.

Figure 7:
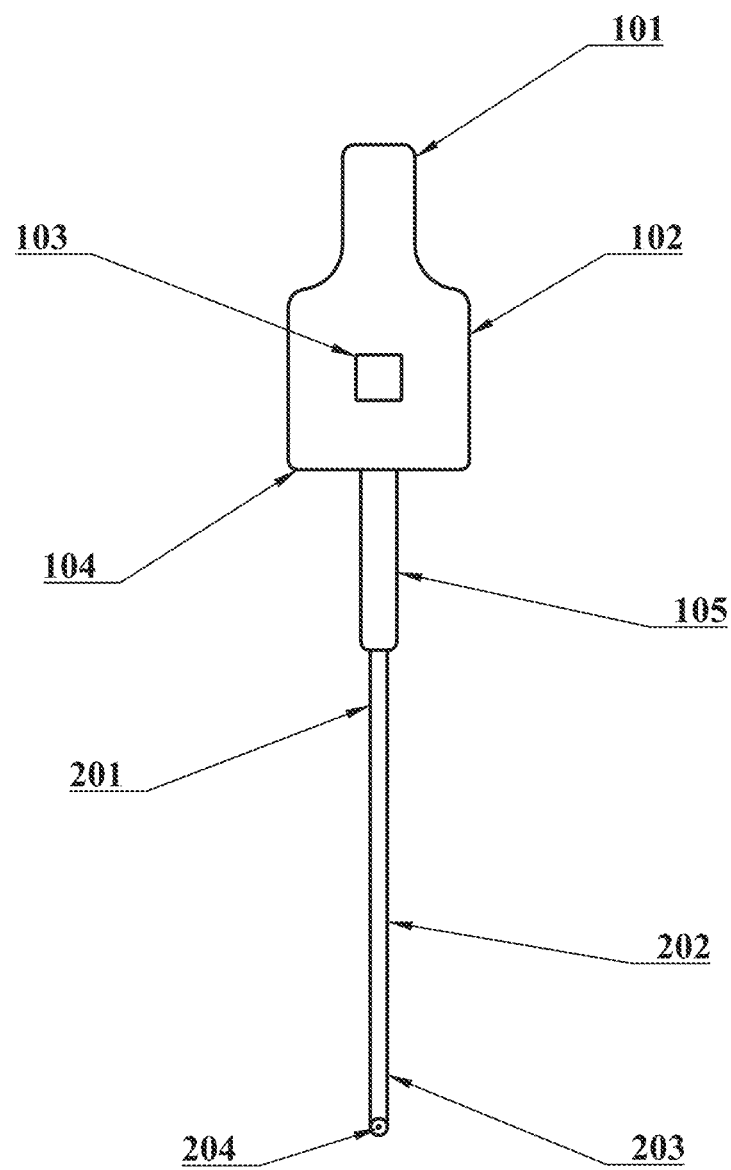
FIG. 7 is a front side view of the main body, according to an embodiment of the present invention.
Figure 8:
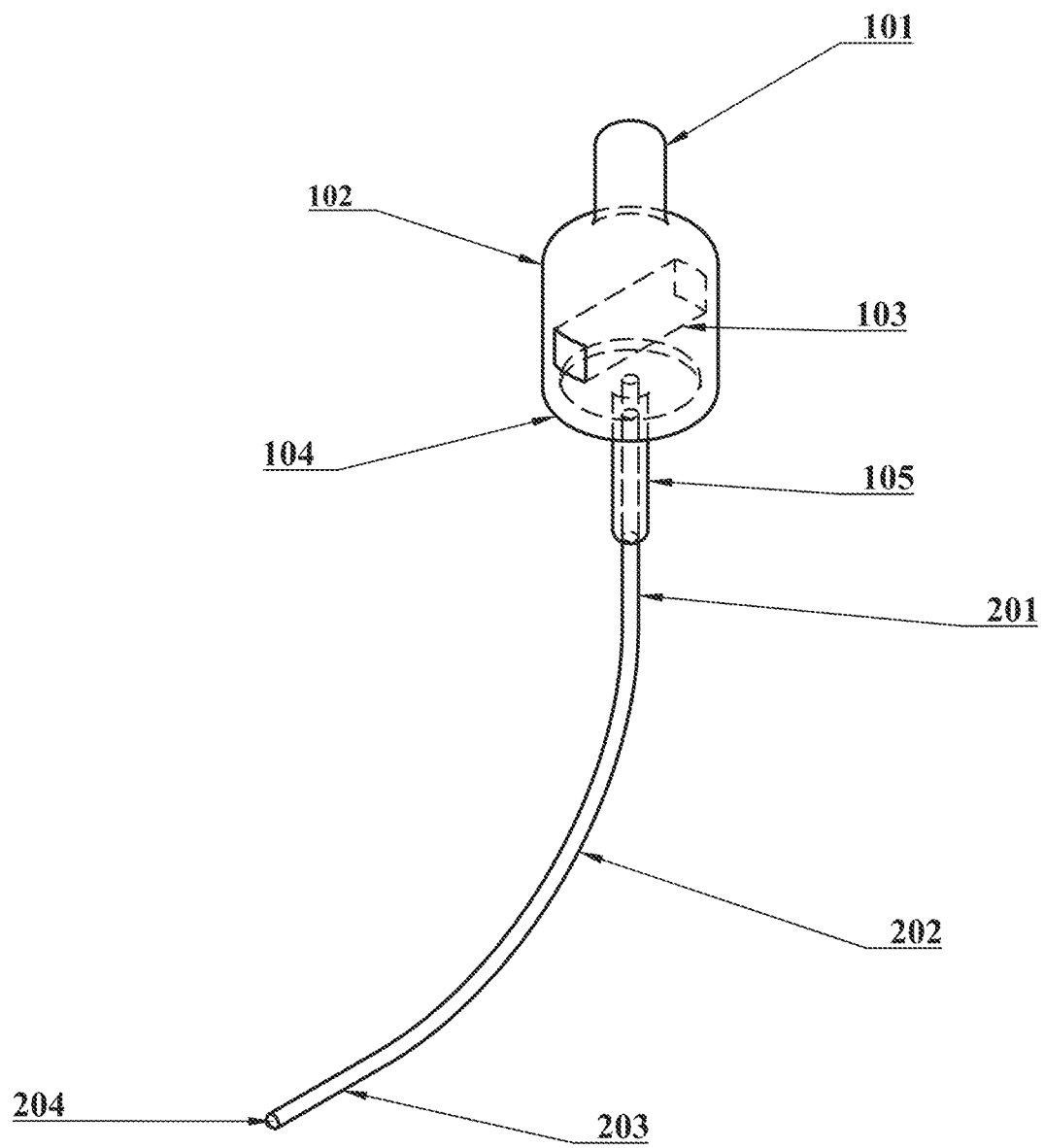
FIG. 8 is a perspective view of the main body, according to an embodiment of the present invention.

As shown in FIG. 7 and FIG. 8, the body 100 comprises a midsection 102 with a grip 101 protruding upward. The midsection 102 contains a keyhole 103 that is perpendicular to the vertical axis of said body 100 into which the indicator key 300 is inserted, allowing said indicator key 300 to be extended parallel to the locating member end 203. The shape of said keyhole 103 is such that the key post 301 can be snugly slid into it without falling back or being pushed completely through. The bottom of the body 100 comprises a lip 104 around the outer rim with a shank 105 protruding downward along the vertical axis of said body 100.

Figure 9:
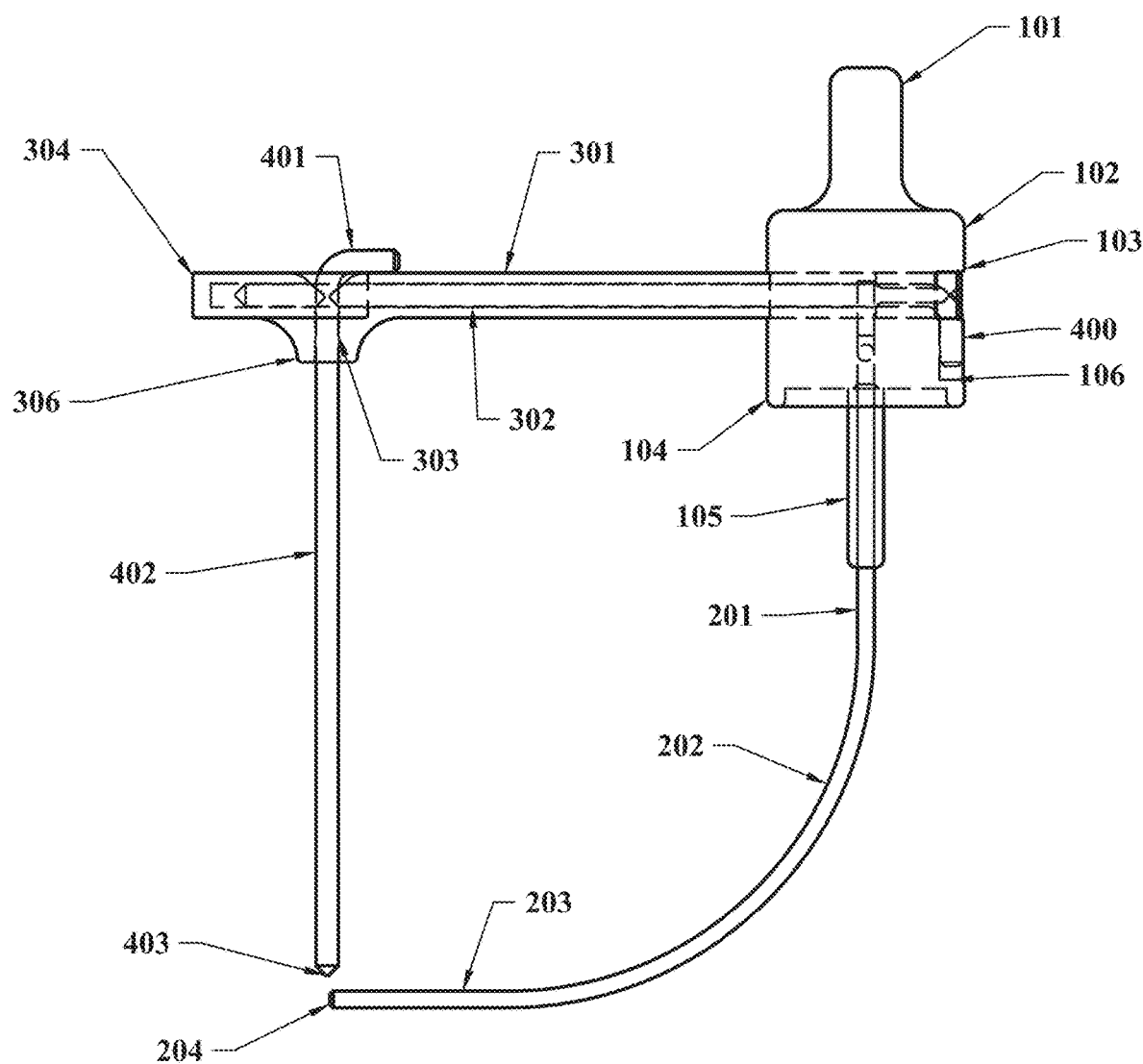
FIG. 9 is a side view of the structural component finder with alignment pin in use, according to an embodiment of the present invention.

In the embodiment illustrated in FIG. 9, the alignment pin 400 has a first end 403 and a second end 401. In this particular embodiment, the first end 403 comes to a point where it contacts the locating member terminal end 204. The second end 401 is curved at a predetermined distance to allow the first end 403 of the alignment pin 400 to align with (e.g., touch) the locating member terminal end 204 to confirm proper calibration. The curve of the second end 401 also prevents the alignment pin 400 from falling through the alignment pin hole 303 by acting as a stop while calibrating the device. In another embodiment, the second end 401 remains straight but is of a size greater than the alignment pin shaft 402 that would act as a stop when the alignment pin 400 is inserted through the alignment hole 303. In use, the first end 403 of the pin is inserted through the alignment hole 303 of the indicator key 300 and extends through until the second end 401 is stopped by the indicator key 300. In one embodiment, the alignment pin shaft 402 is of a length to allow for the first end 403 of the pin to be proximally located to the horizontal plane of the locating member terminal end 204 during calibration. When in this position, the user can verify the proper alignment between the center 303 of the indicator key 300 and the locating member terminal end 204 prior to device usage.

Figure 10:
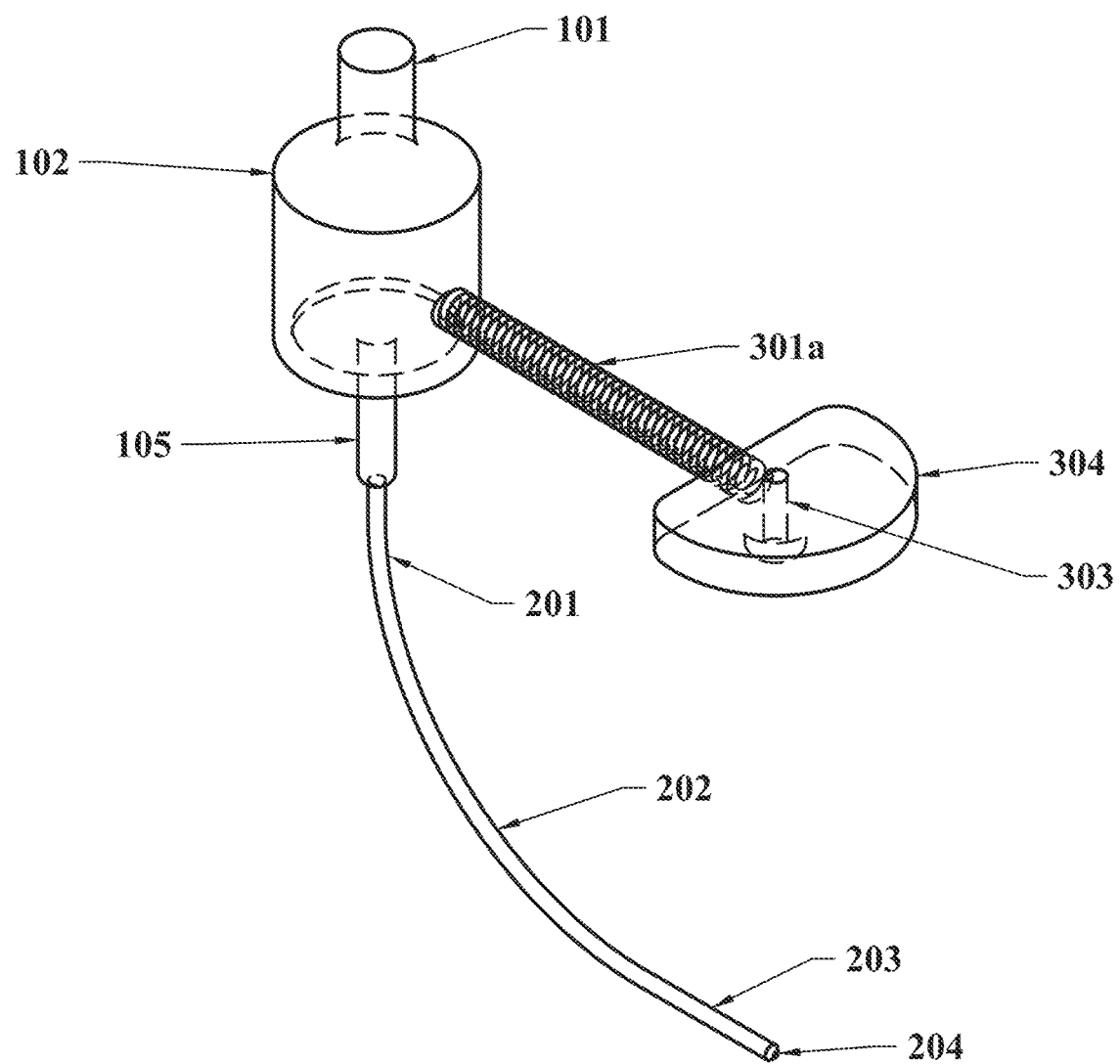
FIG. 10 is a perspective view of the structural component finder with flexible post end of indicator key, according to an embodiment of the present invention.

In the embodiment illustrated in FIG. 10, the indicator key post 301 is made of a spring 301a, allowing for the key post to be bent in any direction while maintaining structural integrity. This aids in the insertion of the locating member 200 in the access hole E and allows the device to avoid contact with objects when in use.

Figure 11A:
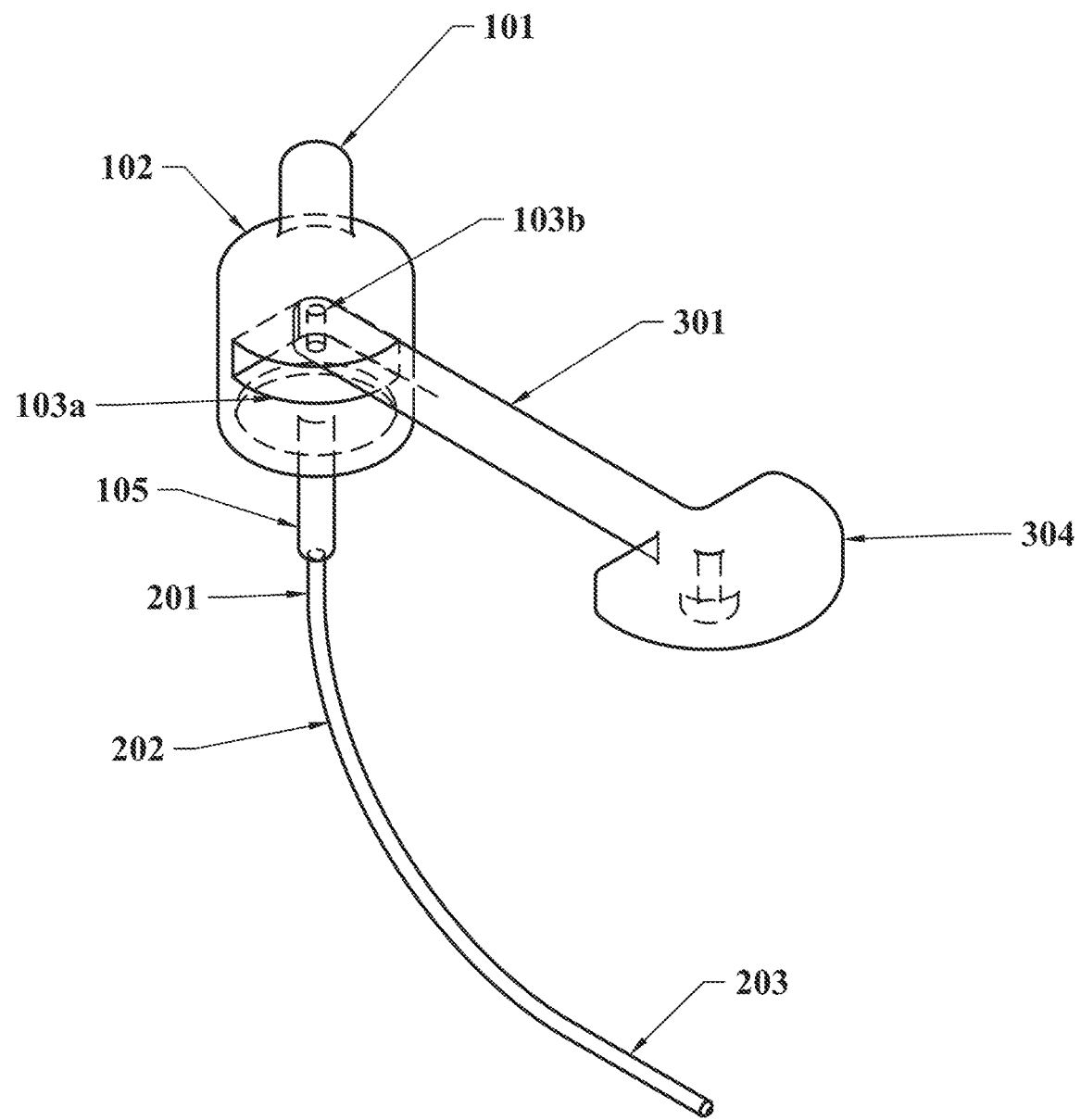
FIGS. 11A and 11B are perspective views of the structural component finder with pivotable indicator key, according to an embodiment of the present invention.
Figure 11B:
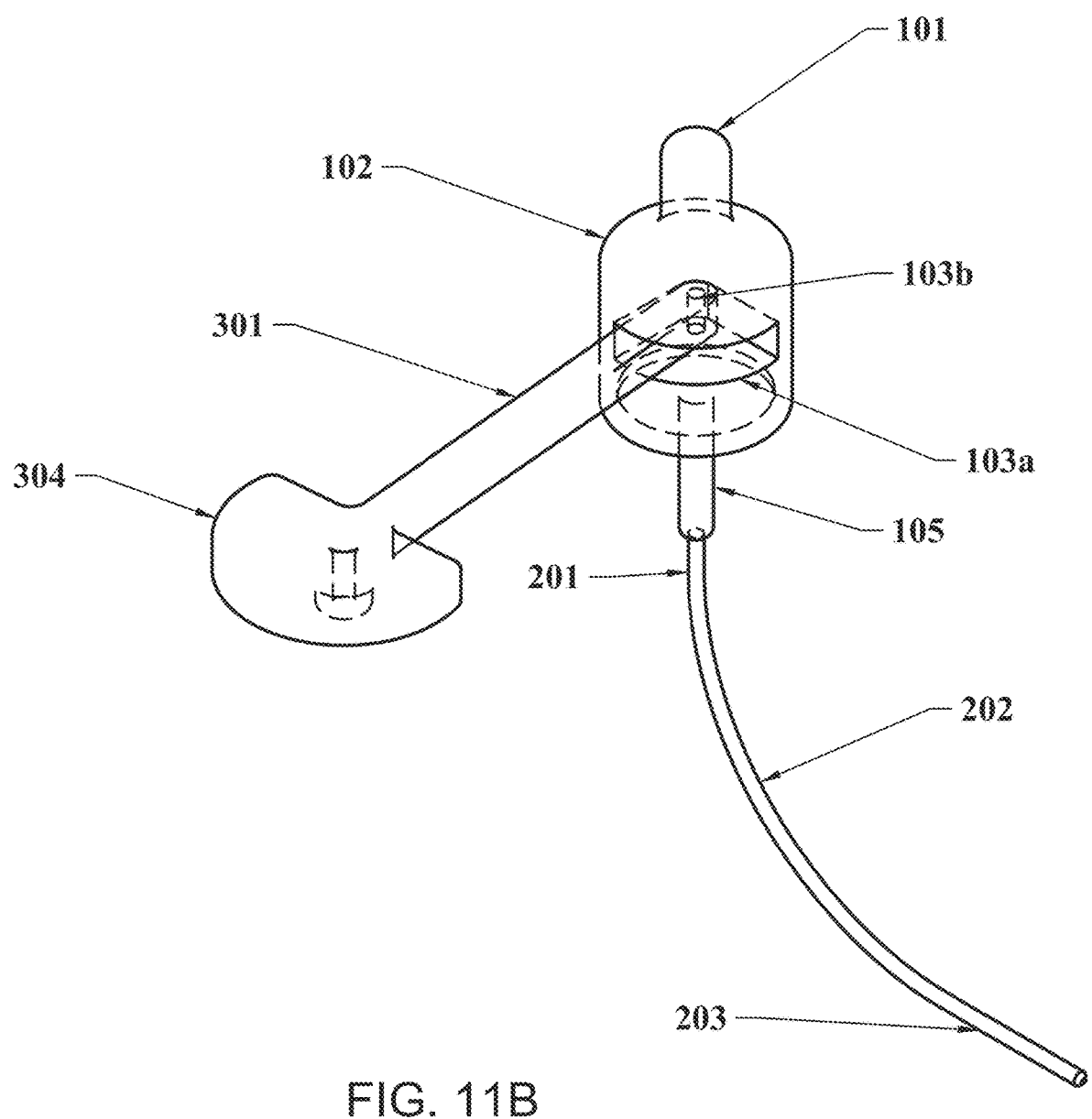

In the embodiment illustrated in FIGS. 11A and 11B, the body 100 is made to allow for the indicator key 300 to move horizontally, allowing for the key to be adjusted to aid in the insertion of the locating member 200 in the access hole E or to avoid contact with objects when the device is in use.

Figure 12:
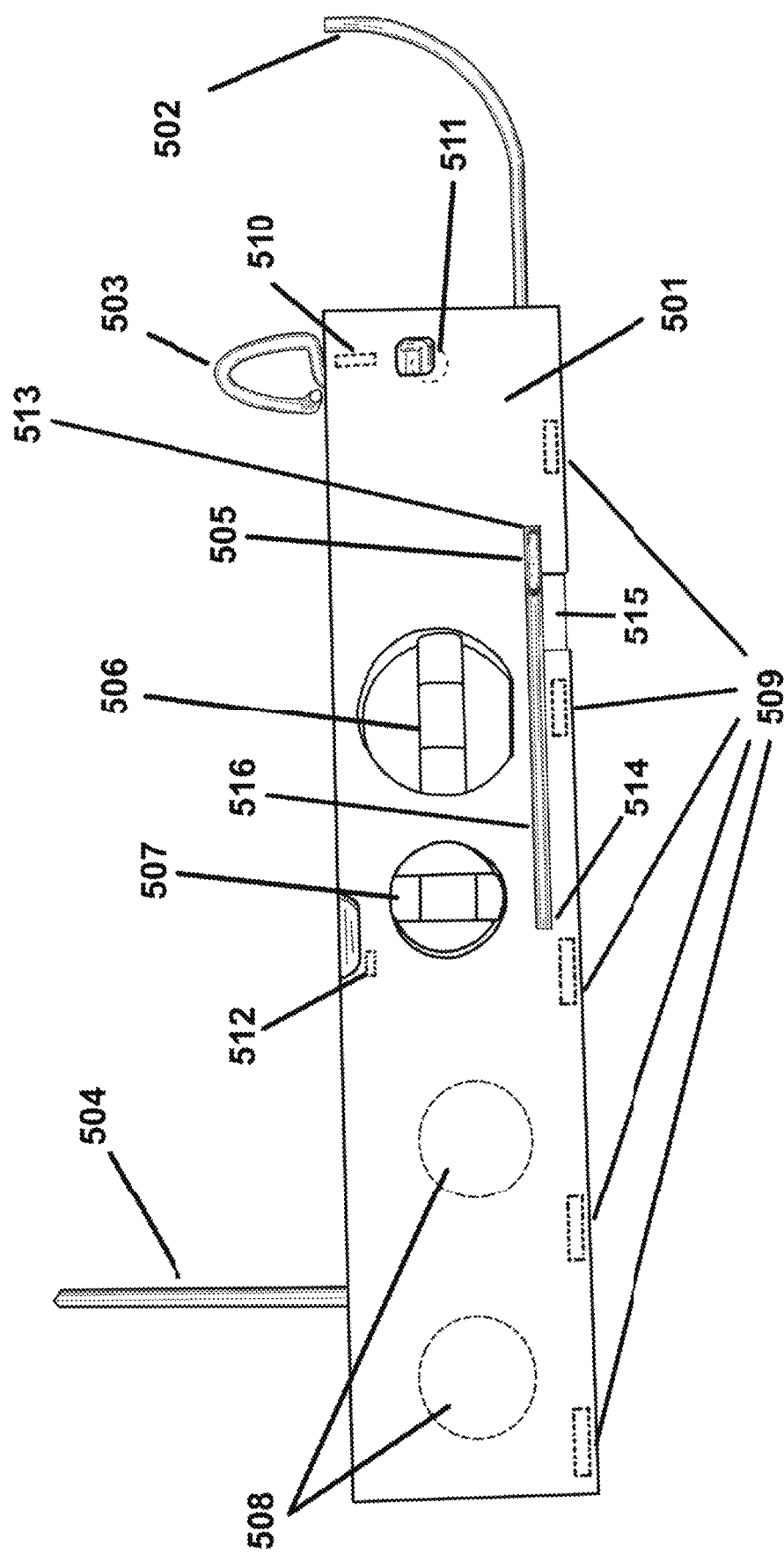
FIG. 12 is a side view of another example embodiment of a tool with a plurality of retractable components in their respective extended position.

FIG. 12 demonstrates an example embodiment of a device including a body 501 with each of its components in their respective extended positions. In this particular embodiment, a locating member 502 is extended out and retracted by maneuvering knob 505 within slot 516. As shown in FIG. 12, knob 505 is maneuvered through slot 516 to extension end 513 so the locating member 502 is in its fully extended position. In FIG. 12, indicator key 503 is shown in its fully extended position, this position being the point at which a center 517 of the semicircular indicator key 503 is coextensive to the terminal end 518 of the locating member 502. Indicator key 503 is held in its extended position by magnets 510 and 511.

Figure 13:
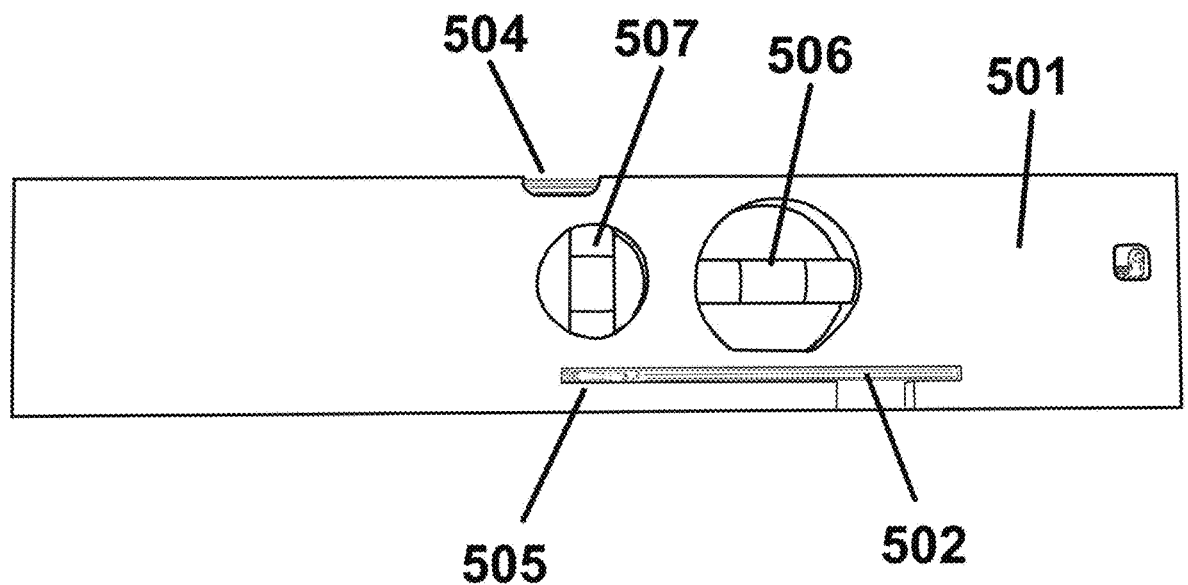
FIG. 13 is a side view of the tool with all retractable components in their retracted position for storage.

FIG. 13 shows the body 501 with all retractable components in their respective storage positions within the body 501 to allow for safe storage. When in its retracted position, locating member 502 is held in place by magnet 510 (shown in FIG. 12), so it is not inadvertently extended while stored. Magnet 509 located closest to indicator key 503 holds it in place so indicator key 503 maintains its retracted position while in storage. Boring tool 504 is also held in its retracted position within body 501 by magnet 512 so as to maintain retraction position while in storage as well.

Figure 14:
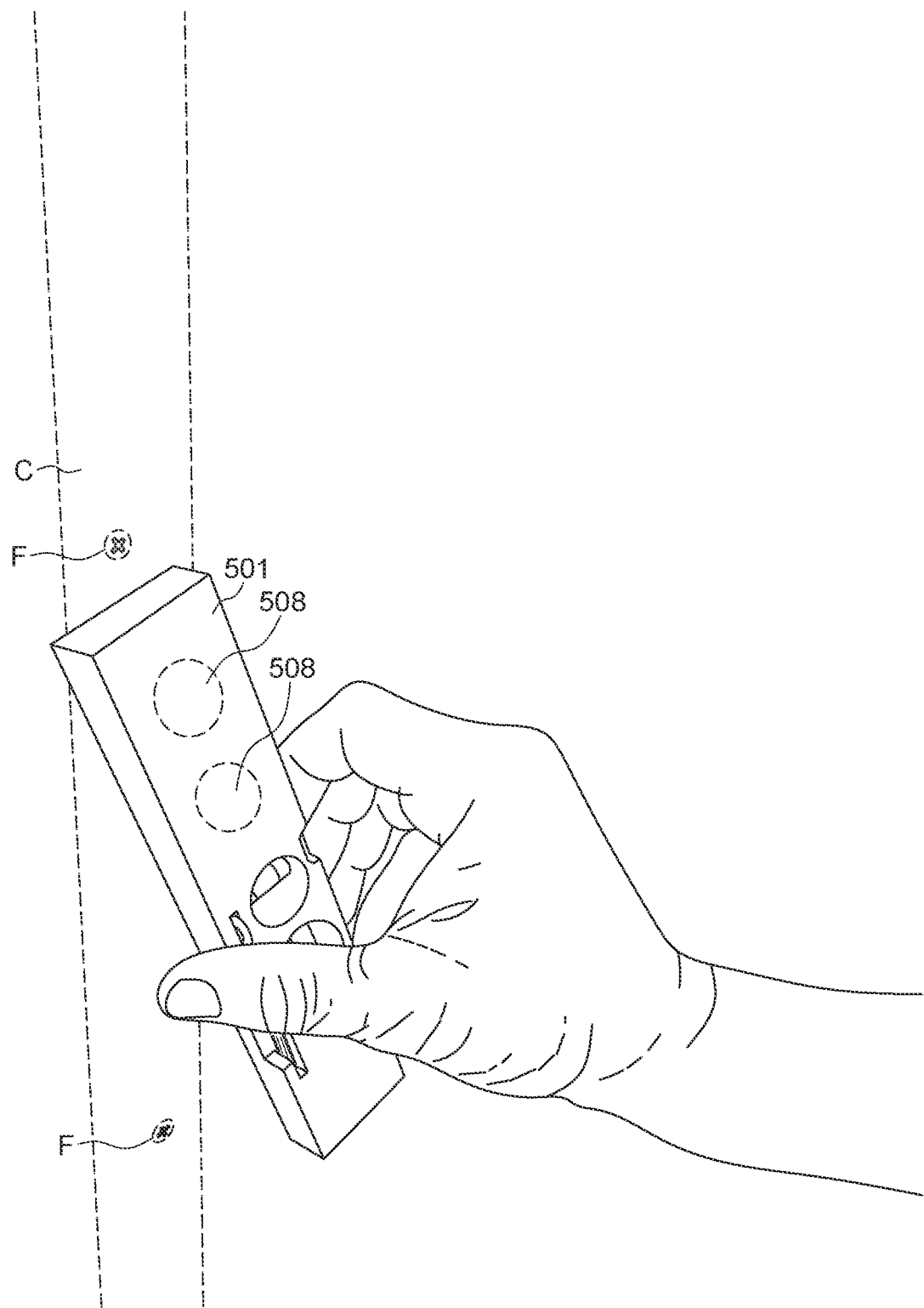
FIG. 14 is a perspective view of the larger magnets locating metallic fasteners within a wall surface such as drywall.

In FIG. 14, body 501 is being held up against surface B and moved about in search of metallic fasteners F, which are attached to hidden structural members C. Located within body 501 are magnets 508, which are strong enough to detect metallic fasteners F. In one embodiment, for example, the magnets 508 are strong enough to detect metallic fasteners F throughout the depth of the surface B. The magnets 508 can be used to determine a general location of a structural member C so the other components of the tool can be used in the correct position in order to locate the center D of structural member C.

As can be seen, the fastener F is not attached in the center D of structural member C. This is generally the case, and why magnets alone cannot be trusted to give an accurate location of the center D of a structural member. Once the magnets 508 detect a metallic fastener F within surface B, body 501 will be pulled magnetically to the location of fastener F to alert user of structural member C. Once the body 501 is fixed over fastener F, the user knows the general location of structural member C and can proceed with using the tool.

Figure 15:
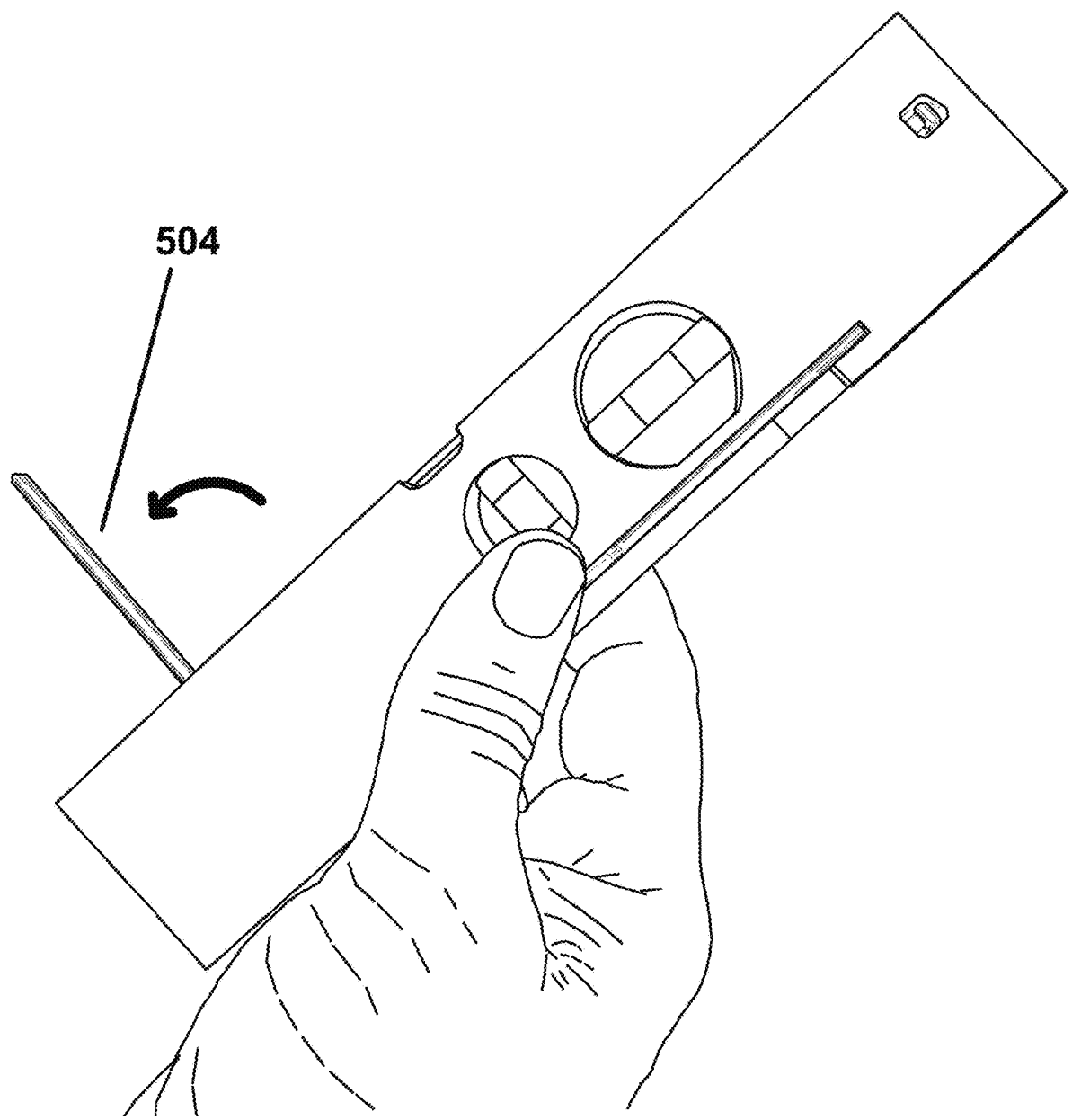
FIG. 15 is a perspective view of the boring tool moved out in its extended position.

The next step is to extend out boring tool 504 from its retracted position, in some embodiments kept there by magnet 512 as seen in FIG. 15. Boring tool 504 is pivoted out of its retracted position until it is relatively perpendicular with the horizontal axis of body 501. Once pivoted completely out, boring tool 504 sits into body 501 and locks into place, so as to provide a strong base from which to use boring tool 504. This way there is no worry that the tool will pivot when in use against surface B.

Figure 16:
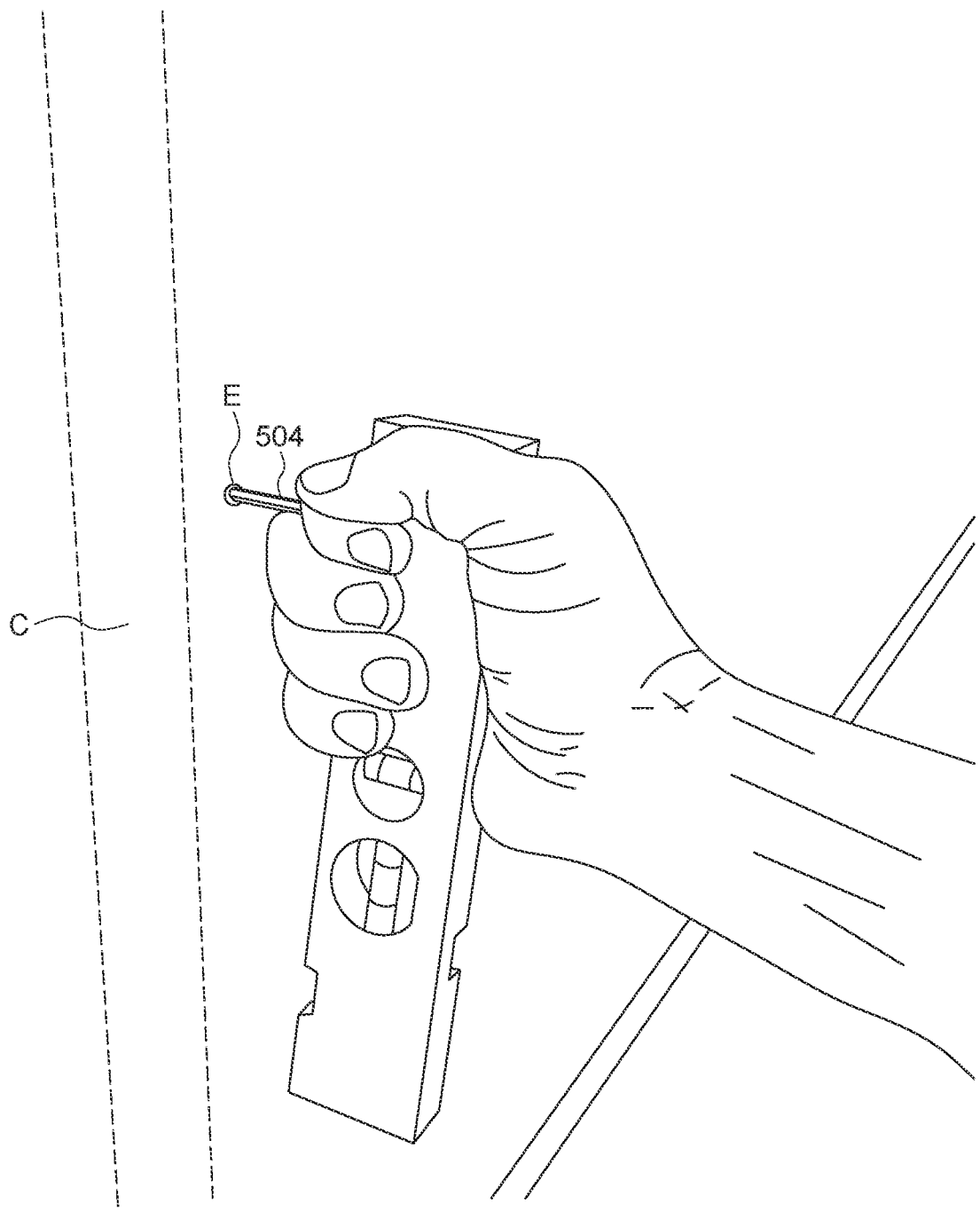
FIG. 16 is a perspective view of the boring tool component being used on a wall surface such as drywall to create an entry hole for other components.

FIG. 16 shows boring tool 504 being used to create access hole E in surface B within vicinity of structural member C. Boring tool 504, in some embodiments, can be used roughly 1" to 1½" to either side of where fastener F is located. This is to avoid boring tool 504 from contacting structural member C when creating access hole E. The user can hold body 501 in such a way that boring tool 504 extends through one's fingers. This allows the force applied to be equal on either side of boring tool 504 so access hole E is relatively perpendicular to surface B. Although in some embodiments provided herein, boring tool is included in the device, other boring members may also be used if desired.

The user can create access hole E in any way possible, however in one example the user twists body 501 clockwise and then back counterclockwise repeatedly, while boring tool 504 is pressed against surface B. This is to avoid creating an access hole E that will be larger than necessary and minimize damage to surface B.

After an access hole E has been created, the next step in locating the center D of structural member C is to extend locating member 502 from its storage position within body 501. Knob 505 is a part of locating member 502 to be used in moving locating member 502 about the body 501. Knob 505 is pushed from retraction end 514 towards extension end 513, so locating member 502 is moved out of its retracted position within body 501.

Figure 17:
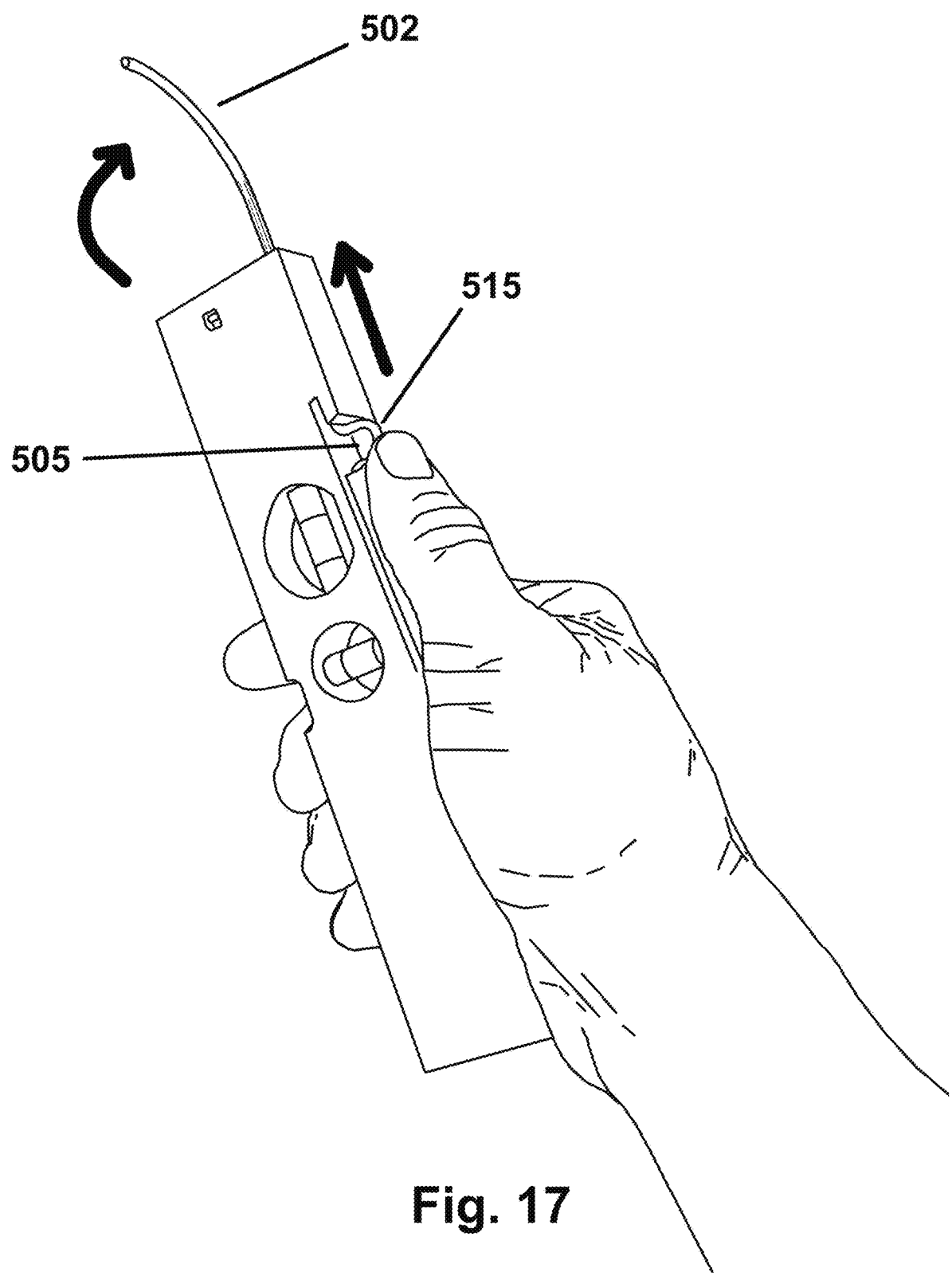
FIG. 17 is a perspective view of the finding member being extended out of its storage position within the main body and rotated into its insertion position.

As knob 505 is pushed towards extension end 513, it is stopped when lined up with insertion notch 515. It is then rotated into insertion notch 515, thus rotating the entire locating member 502 with it to its insertion position as seen in FIG. 17. This allows locating member 502 to be inserted through access hole E easily without having to be enlarged to compensate for body 501 obstructing insertion of locating member 502 into access hole E.

Figure 18:
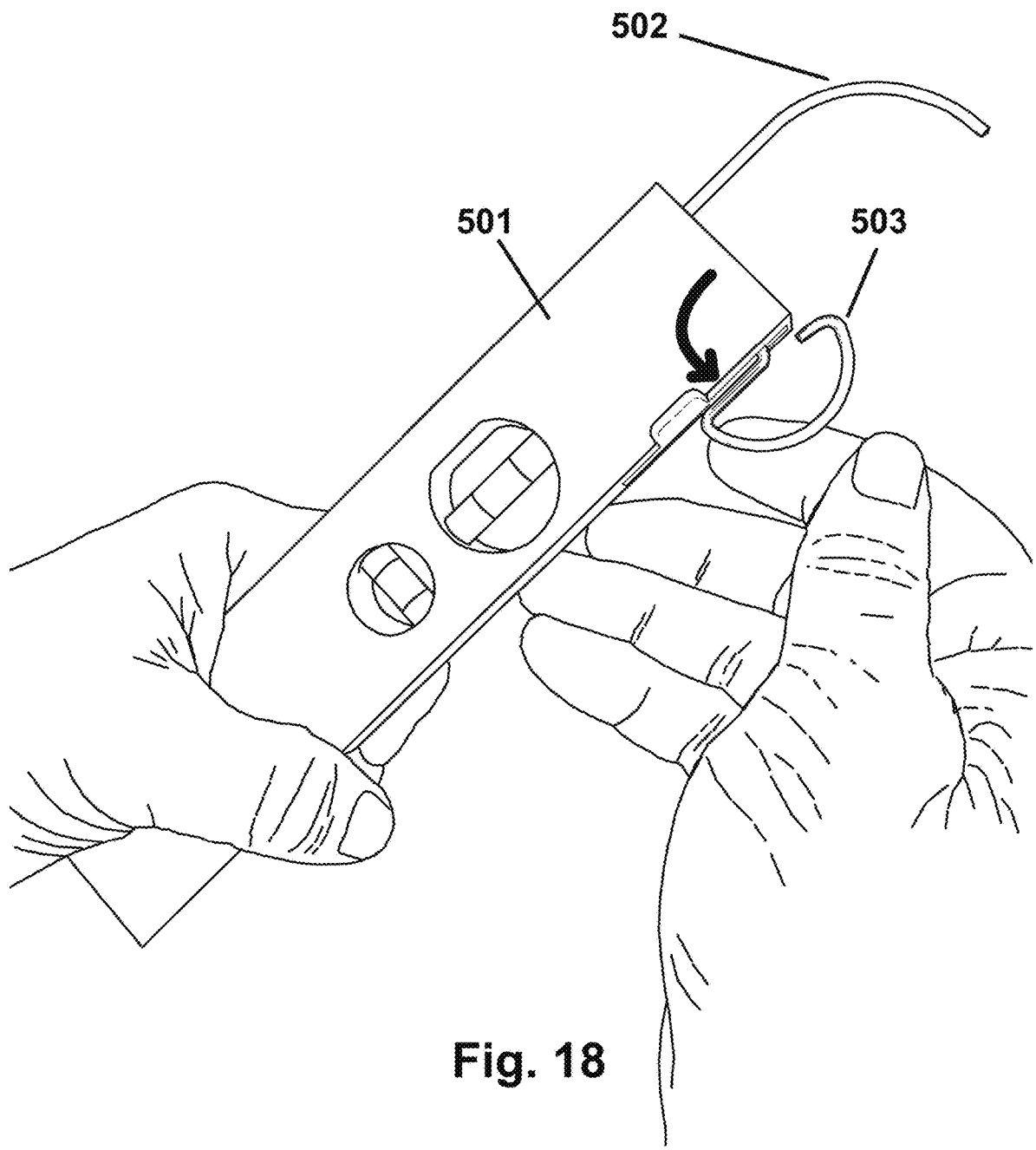
FIG. 18 is a perspective view of the indicator key being pivoted out of the main body.
Figure 19:
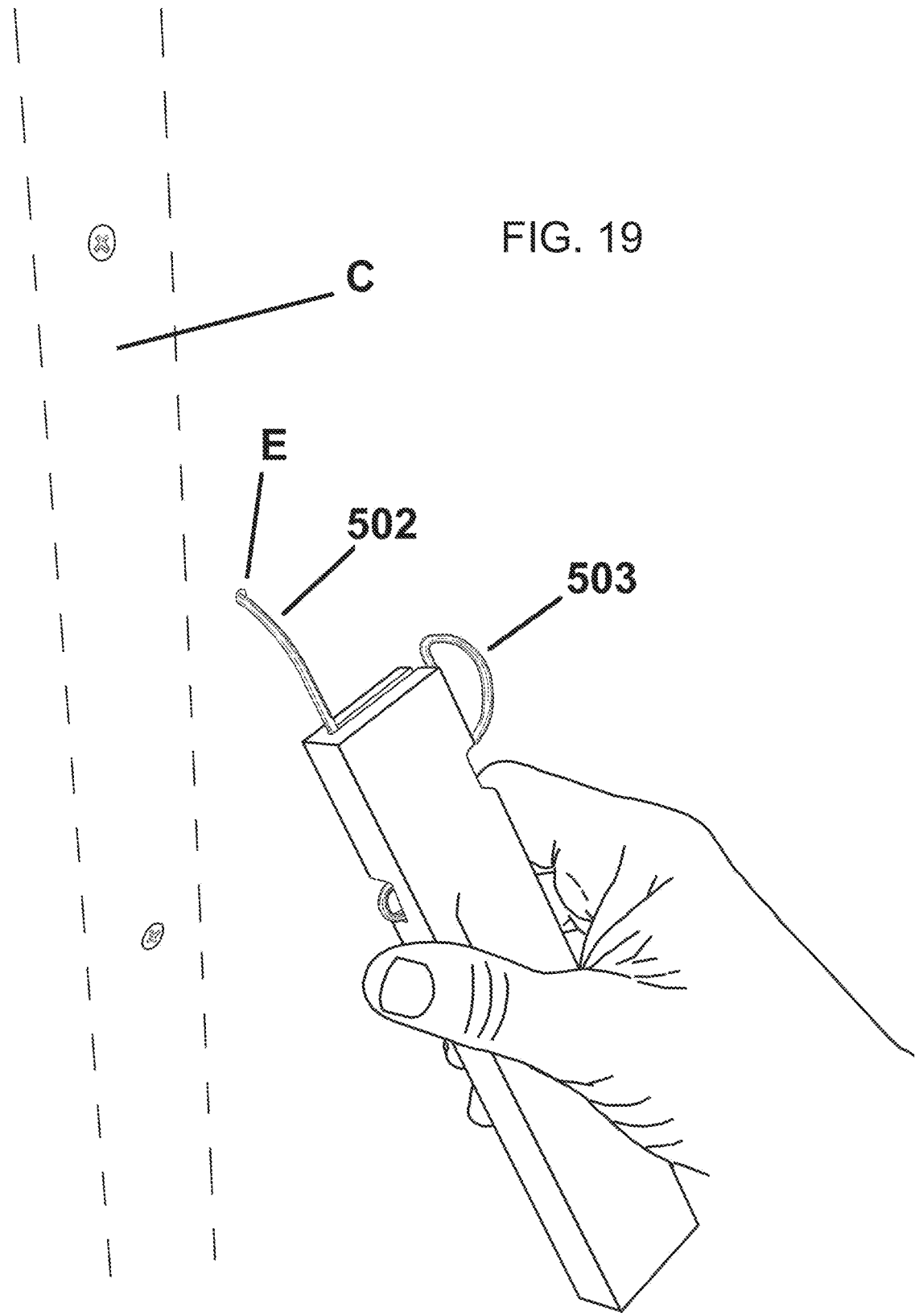
FIG. 19 is a perspective view of the locating member being inserted into the access hole in the surface.

The indicator key 503 is also pivoted out of its storage position within body 501 at this time as shown in FIG. 18. Indicator key 503 will be used shortly to relay position of locating member 502. Now locating member 502 is inserted into access hole E, seen in FIG. 19, until body 501 is seated flush against surface B.

Figure 20:
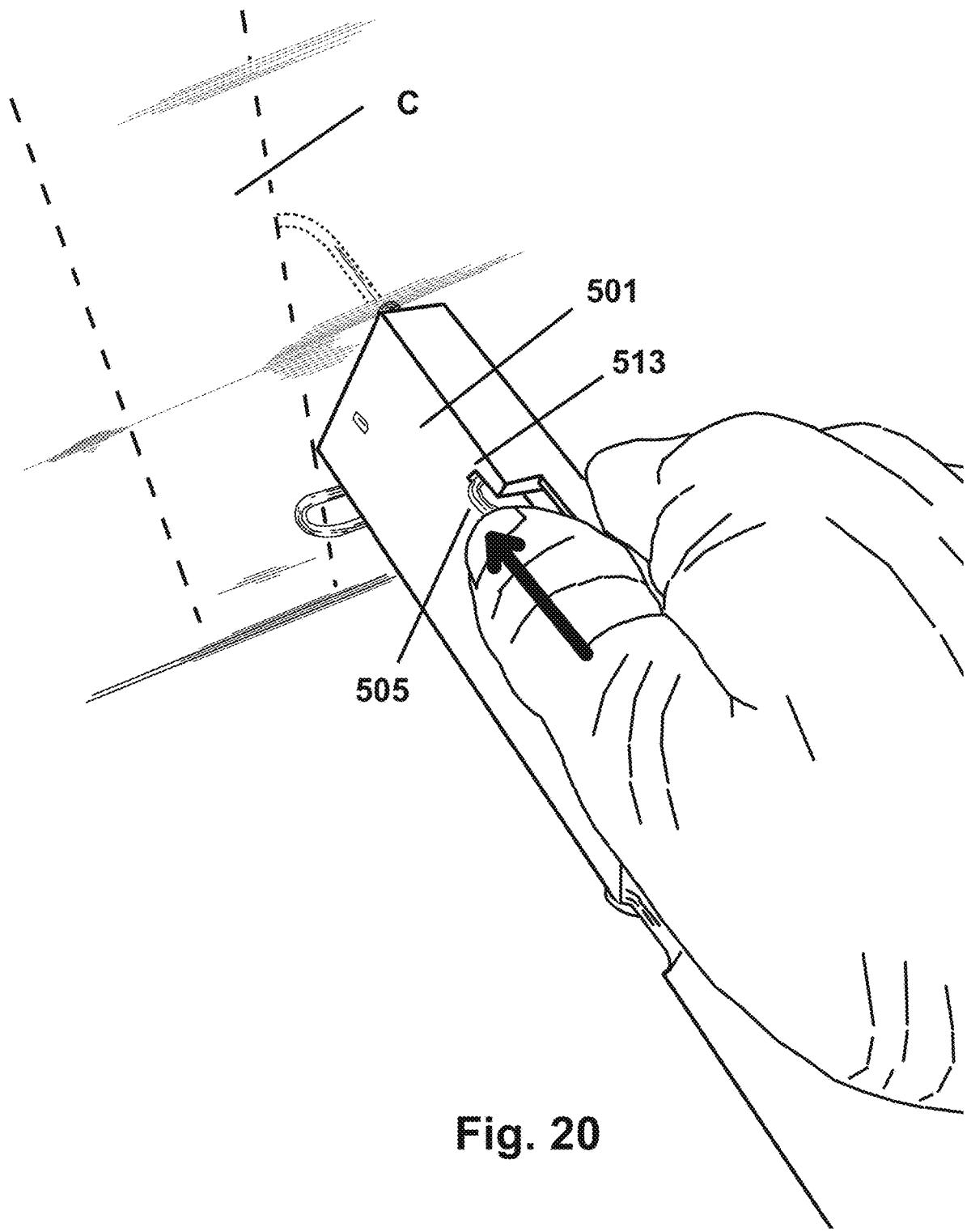
FIG. 20 is a perspective view of the locating member being rotated to its extended position.

Once fully inserted, locating member 502 is moved into its final extended position. To do this, knob 505 is rotated back into slot 516, and then pushed completely to extension end 513. After doing this, indicator key 503 is pivoted again, this time about its vertical axis, ending in its final extended position. At this point, seen in FIG. 20, the center 517 of the semicircle indicator key 503 and the terminal end 518 of locating wire 502 are coextensive to each other.

Figure 21:
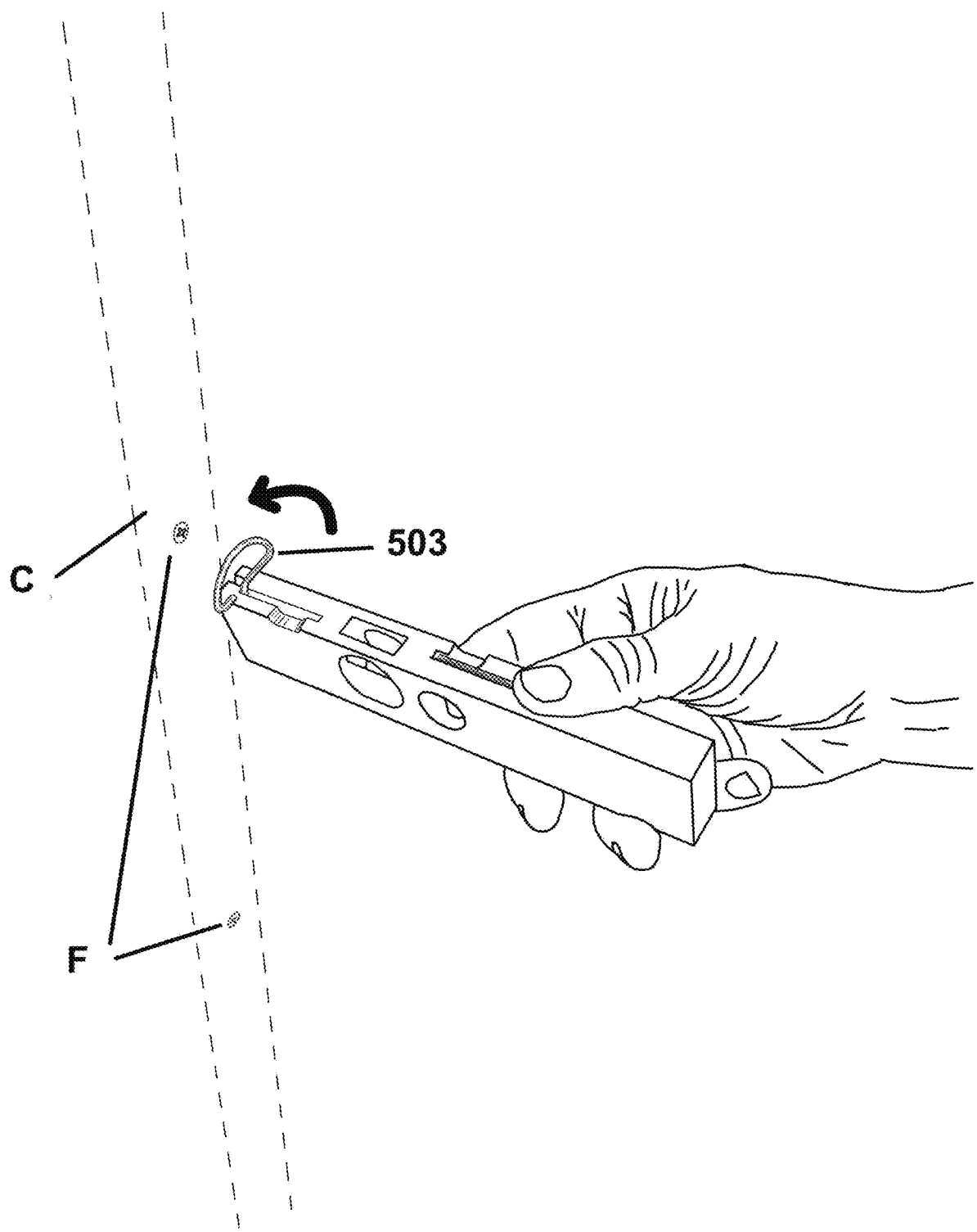
FIG. 21 is a perspective view of the main body being rotated until it is stopped by the hidden structural component.

At this point, both components of body 501 are in position to locate and relay the central position of structural member C. Body 501 is then maintained in its position flush with surface B and is rotated until it is stopped. As seen in FIG. 21, body 501 is stopped when locating member 502 contacts structural member C below surface B. The terminal end of locating member 502 relays its position above surface B as the center of indicator key 503.

Figure 22:
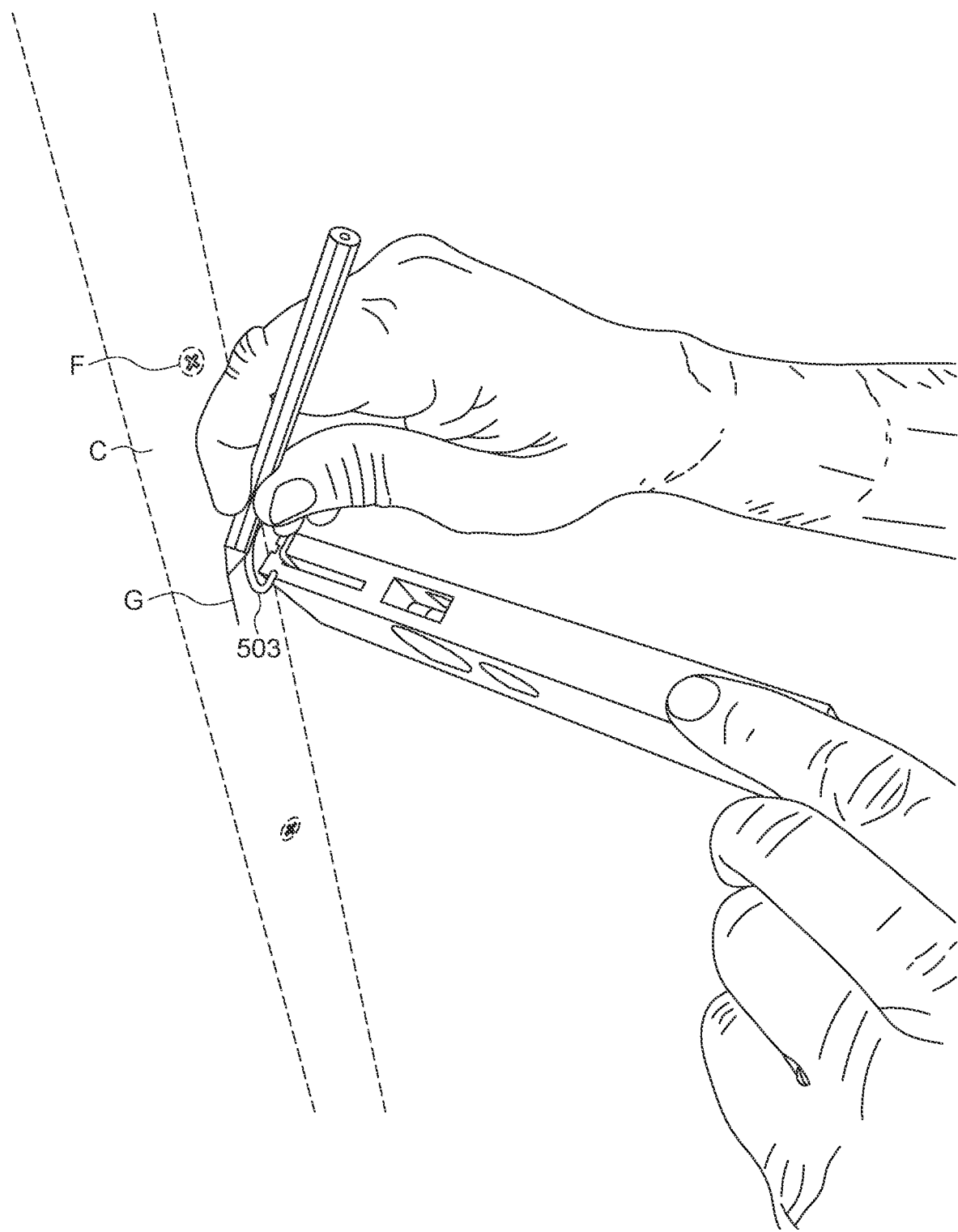
FIG. 22 is a perspective view of the center location being marked.

Using this position, indicator key 503 then directs user to position of center D over structural member C, which is being located. Indicator key 503 being a semicircle with a radius equal to approximately half the width of a standard structural member, the part of the edge that is furthest towards structural member C being found is the location of the center D of structural member B. Shown in FIG. 22, the user marks this location with mark G using a marking device based on indicator key 503.

Figure 23:
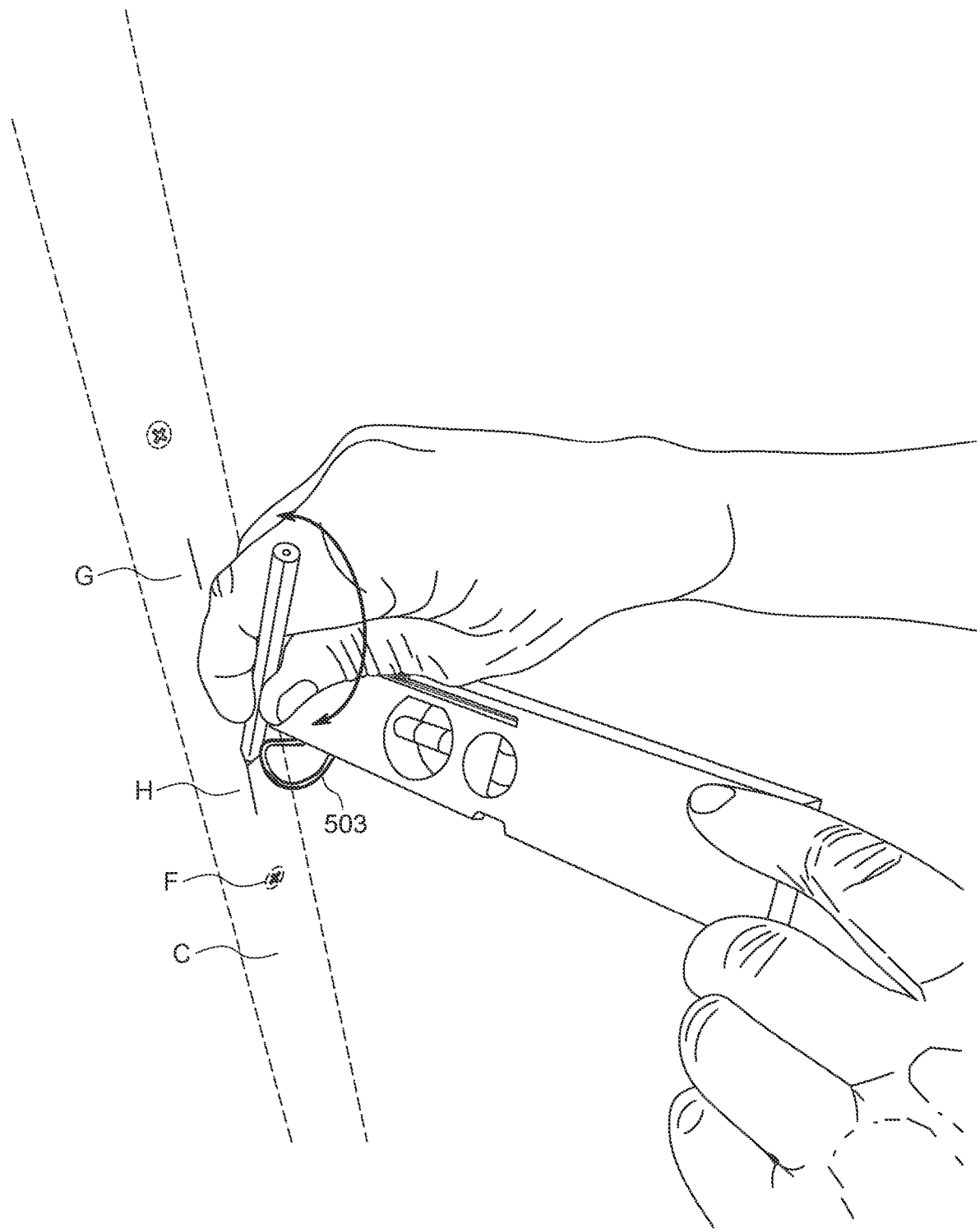
FIG. 23 is a perspective view of the body being rotated in the opposite direction until it is stopped, and the center subsequently marked.
Figure 24:
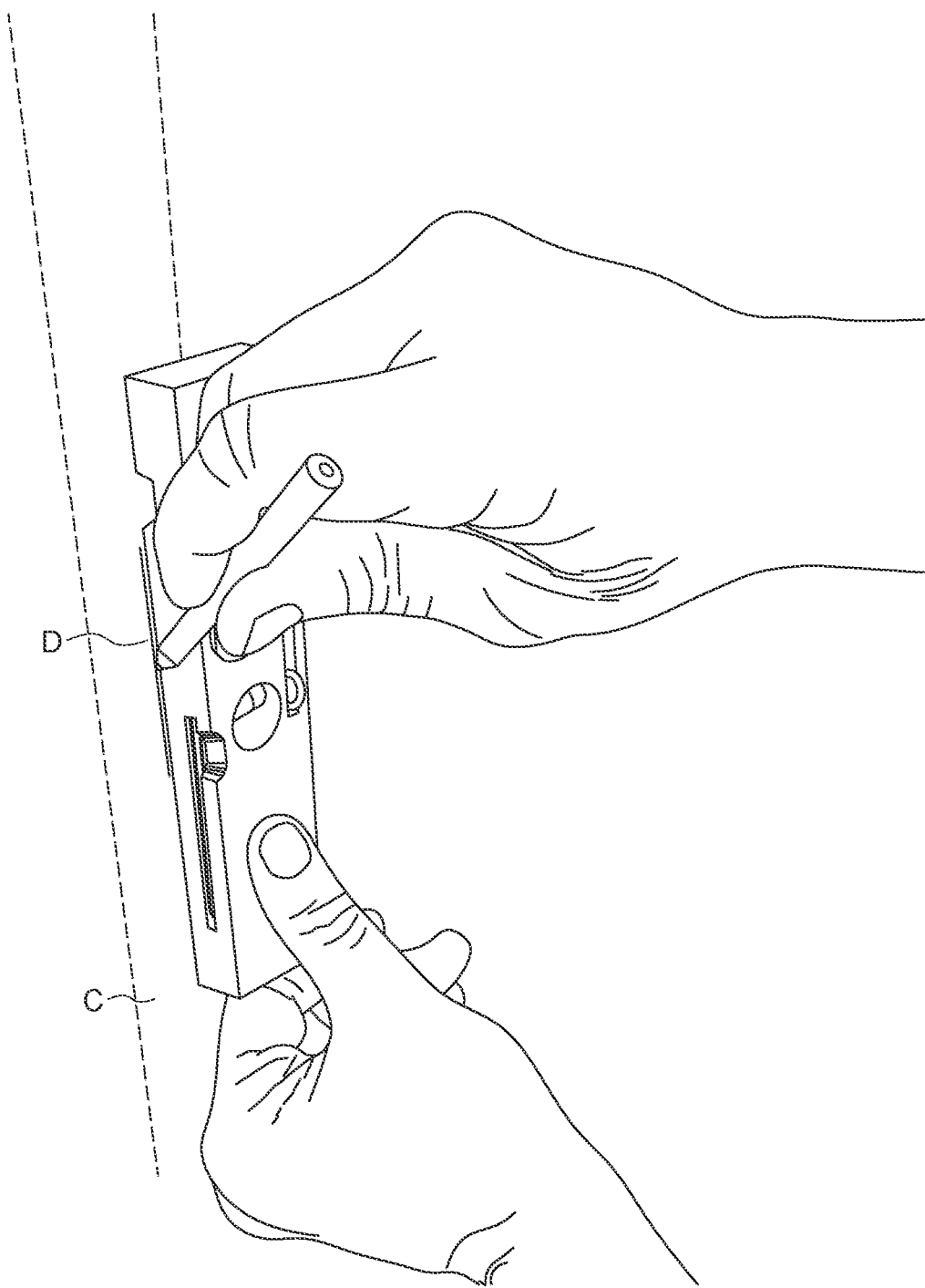
FIG. 24 is a perspective view of the two center marks being connected to create a centerline.

Body 501 can be then rotated in the opposite direction until structural member C stops locating member 502 again. As shown in FIG. 23, the same approach is used to mark the center D of structural member C in a separate location mark H. This gives the user two marks G and H with which to create centerline D above hidden structural member C as displayed in FIG. 24. A line is generally more useful because the user can now attach to any point on the line and know it is centered (e.g., within a center third of the structural member).

Figure 25:
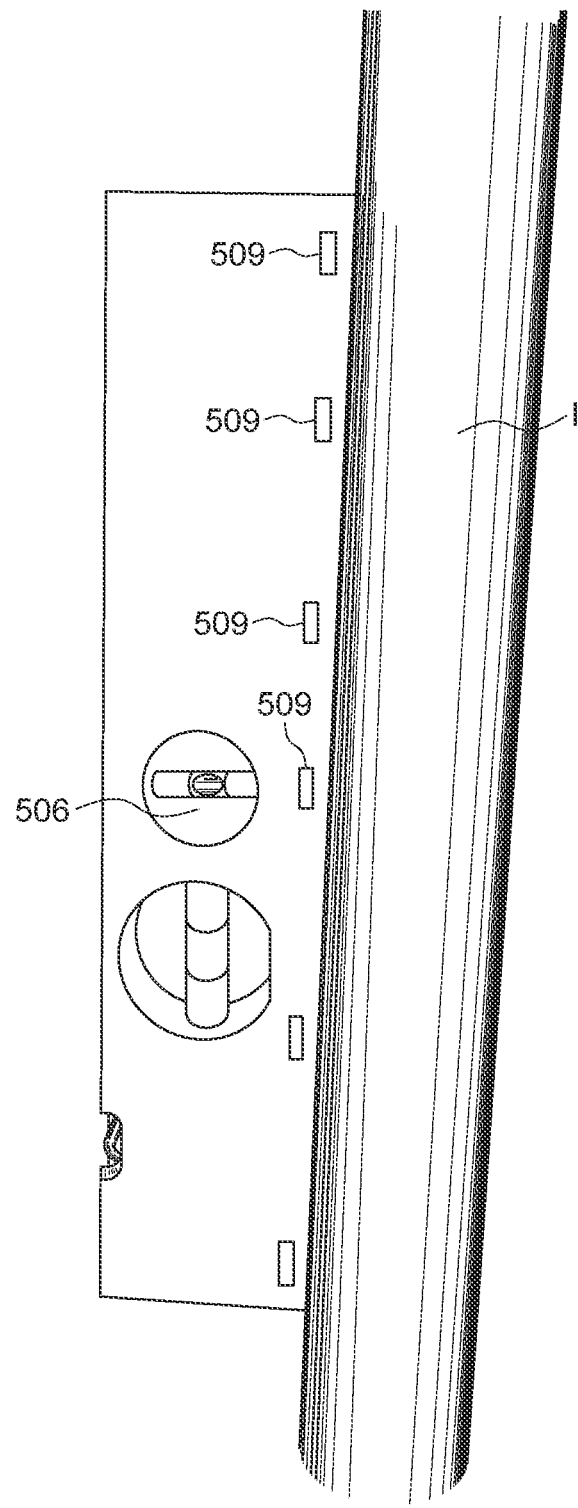
FIG. 25 is a perspective view of the body being held magnetically to a metallic object for leveling purposes.

FIG. 25 shows body 501 being held to metallic structure I by magnets 509. This is so that when one is using the device as a leveling tool, the body 501 does not need to be held in place. The body 501 can support itself whenever one is trying to level a metallic object I. Magnets 509 are also to allow for easy storage of body 501 against a metallic structure I.

Figure 26:
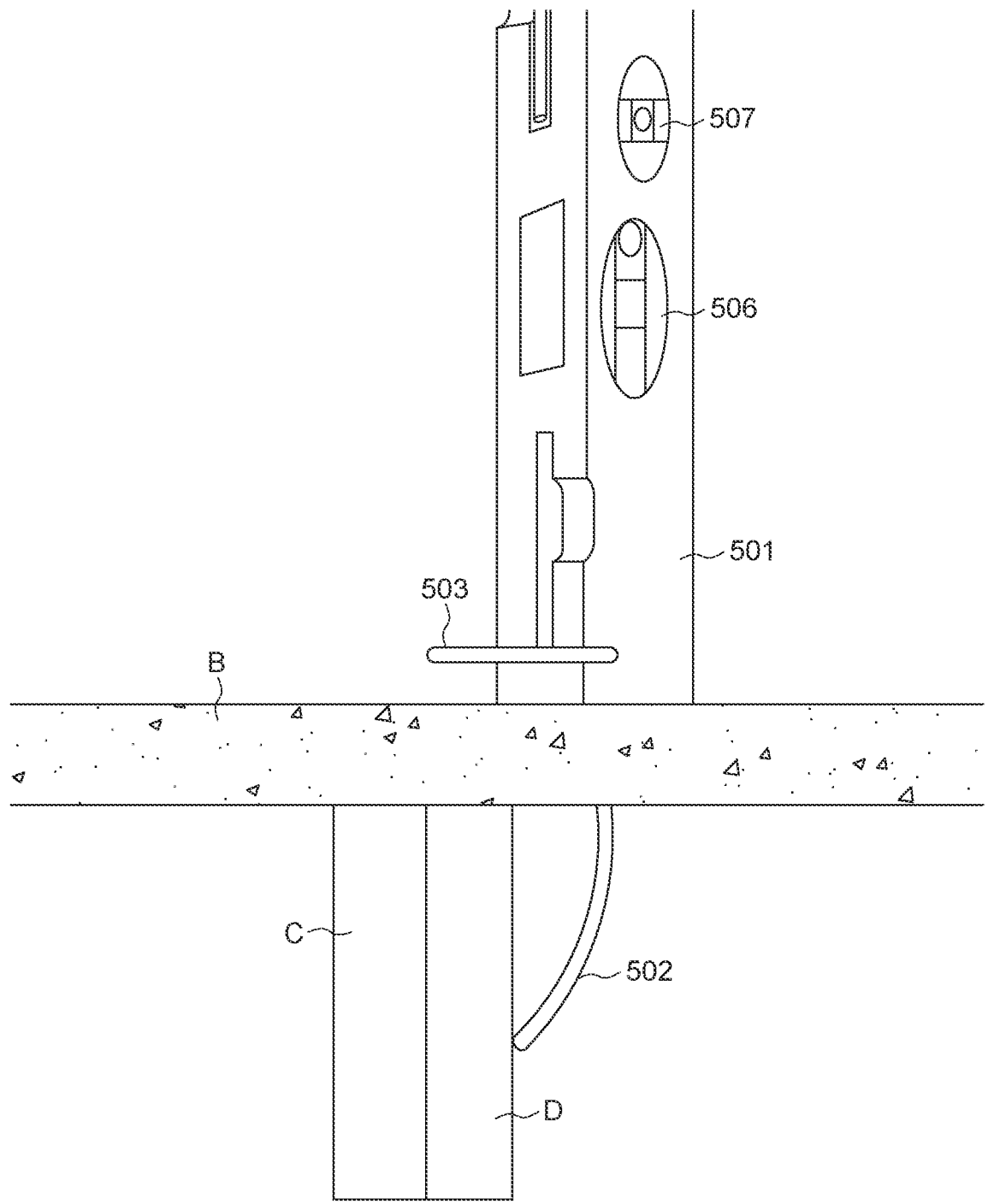
FIG. 26 is a cross sectional view of the tool in use.

FIG. 26 is a cross-sectional view of the tool in use. Body 501 is rotated until locating member has contacted structural member C. As seen, indicator key 503 relays the position of the center D of structural member C with its edge that reaches out furthest towards the presumed location of structural member C. The edge of indicator key 503 that directs the user to the center D of structural member C changes as the distance from access hole E to structural member C varies. This is why, in this embodiment, indicator key 503 has a radius equal to half the width of structural member C. No matter where locating member 502 is inserted, the center location D can be relayed to the user.

Figure 27:
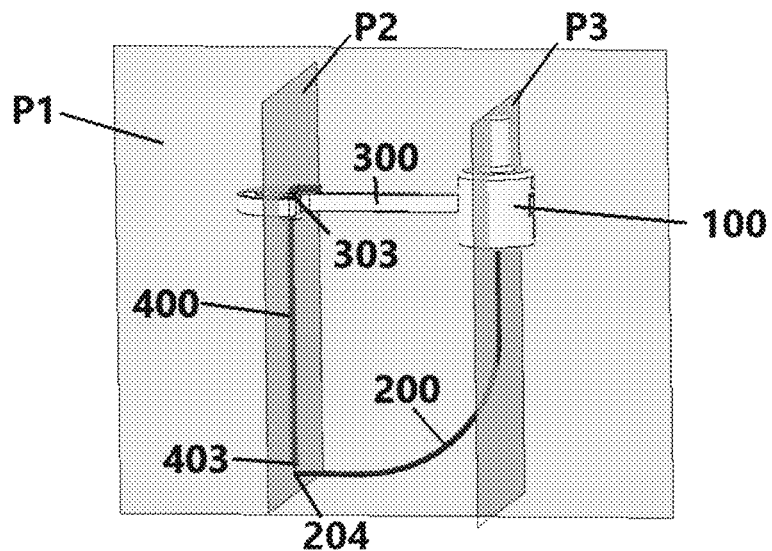
FIGS. 27-29 show an example embodiment of a device with a plurality of planes illustrating example component relationships of the device.

FIG. 27 is a slightly elevated view of one embodiment of a device from the side to show planes P1, P2, and P3. FIG. 27 allows one to see how the planes P1, P2, and P3 relate to each other as well as how the planes bisect the centers of the components. In this example, planes P2 and P3 are both perpendicular to plane P1 and parallel to each other.

Figure 28:
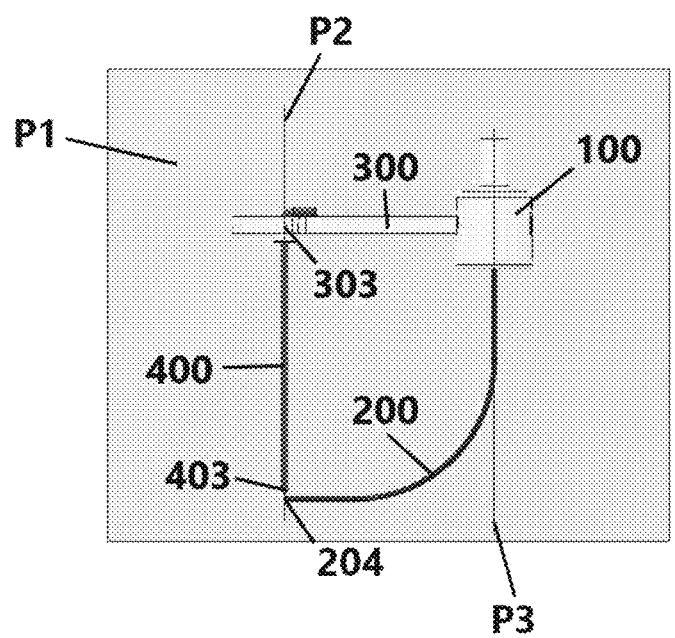

FIG. 28 is a side view further showing that planes P2 and P3 are parallel to each other. The figure also shows how plane P2 bisects the center of an alignment pin hole 303 and alignment pin 400, when in use for calibration, and touches the terminal end 204 of locating member 200. This further shows a coextensive relationship between the alignment pin hole 303 of indicator key 300 and the terminal end 204 of locating wire 200.

Figure 29:
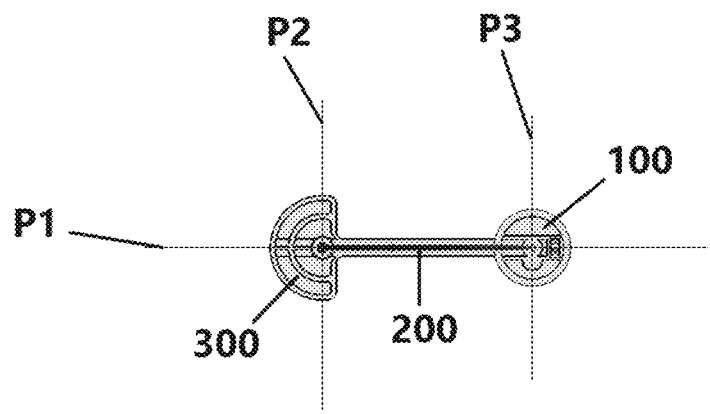

FIG. 29 shows a bottom view of planes P1, P2, and P3. This view again shows the coplanar and coextensive relationship between the alignment pin hole 303 and the terminal end 204 of locating member 200. Also shown is how the alignment pin 400 works to calibrate the tool for accuracy.

Figure 30:
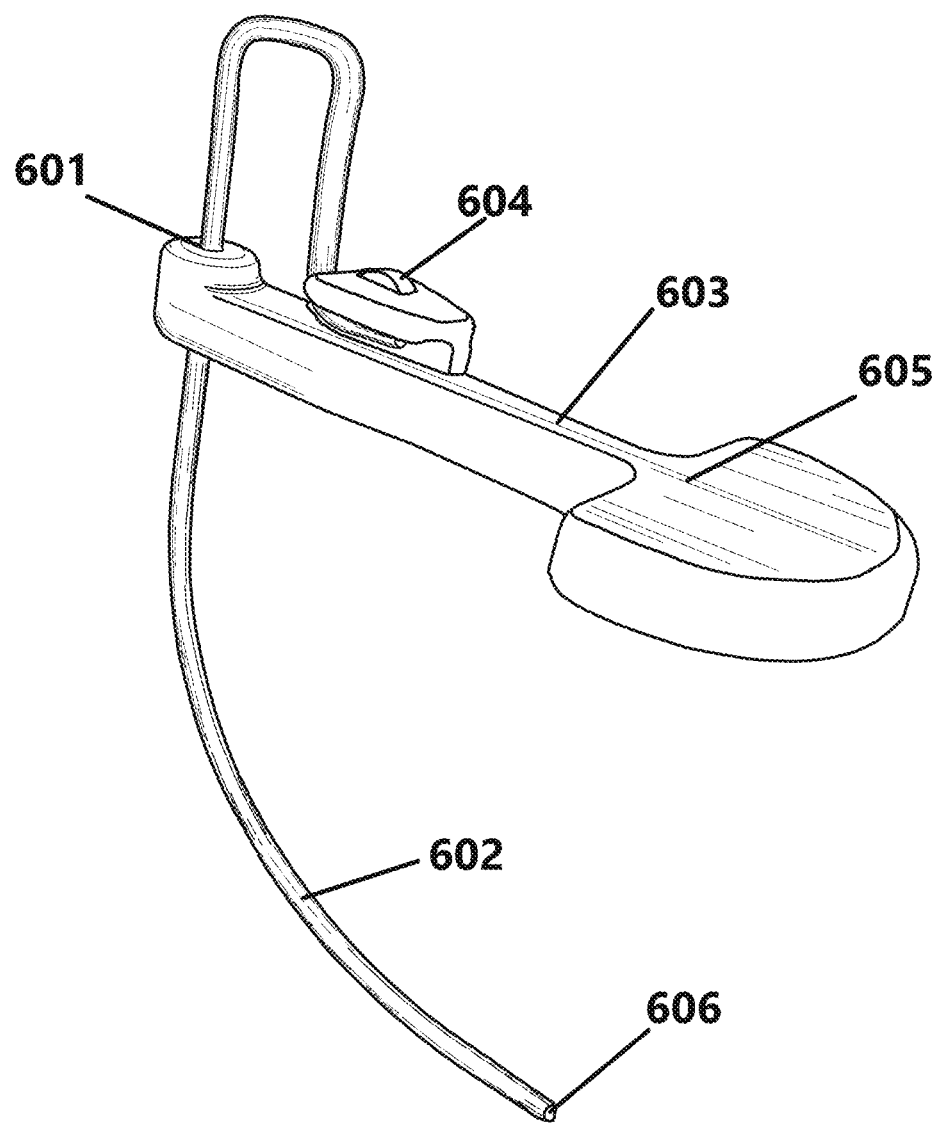
FIGS. 30 and 31 are perspective views showing another embodiment of a structural component finder device.

FIG. 30 shows another embodiment of a structural component finder device detailing that the coupling 601 between the locating member 603 and the indicator key 602 can be accomplished without the need for a separate body to attach to. In this embodiment the post of the indicator key 603 is attached to the locating wire 602 through hole 601 in the indicator key 603. Hole 601 has a slightly smaller diameter than the diameter of the locating wire 602. This causes a tight interference fit which allows locating member 602 to rotate, without sliding off of the indicator key 603. In this particular embodiment, a magnet 604 is provided to hold the locating member 602 in a position that ensures the coextensive relationship between the key head center 605 and terminal end 606 of locating wire 602, although other designs are also contemplated.

Figure 31:
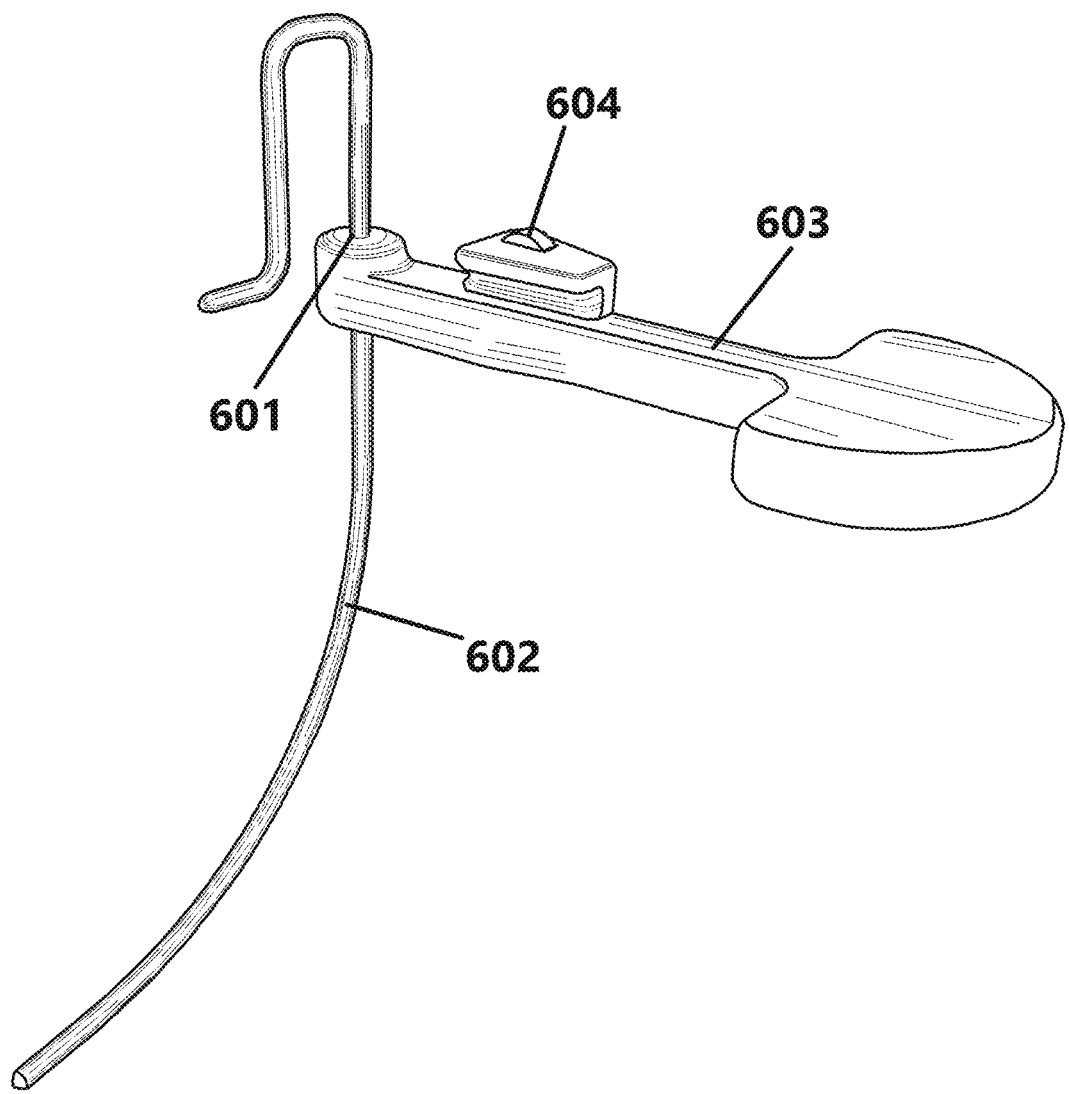

FIG. 31 shows how locating member 602 rotates in hole 601 to allow for insertion through a hole in the wall without indicator key 603 obstructing.

Although implementations have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. For example, a locating member may be directly or indirectly coupled to an indicator key, such as but not limited to via a body, stem, post or other component. It is intended that all matter contained in the above description or shown in the accompanying drawings shall be interpreted as illustrative only and not limiting. Changes in detail or structure may be made without departing from the spirit of the invention as defined in the appended claims. The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A device adapted to locate a location within a hidden structural component, the device comprising:
a locating member extending from a proximal end and extending along a generally curved path coplanar to a vertical axis of the device and extending away from the vertical axis to a terminal end of the locating member; and
an indicator key coupled to the locating member comprising a post and a head coupled to the post, the head comprising an arcuate shape having a radius extending from a center point to a perimeter of the arcuate shape of the head, wherein the terminal end of the locating member and the center point of the indicator key head have a generally coextensive relationship and the radius of the indicator key head extends beyond the terminal end of the locating member to extend beyond an edge of the hidden structural component when the terminal end of the locating member is disposed adjacent to the hidden structural component in use.

2. The device of claim 1 wherein the arcuate shape of the indicator key comprises a semicircular or circular shape.

3. The device of claim 1 wherein the radius comprises at least one-third a thickness of the hidden structural component.

4. The device of claim 1 wherein the radius comprises about one-half the thickness of the hidden structural component.

5. The device of claim 1 wherein the locating member and the indicator key are coupled via a main body.

6. The device of claim 5 wherein the main body comprises a shank comprising a proximal end and a distal end, the proximal end of the locating member extending from the distal end of the shank.

7. The device of claim 5 wherein the post of the indicator key extends from the main body.

8. The device of claim 1 wherein the indicator key comprises an alignment pin calibration hole disposed substantially coextensive to the terminal end of the locating member.

9. The device of claim 8 wherein the alignment pin calibration hole is disposed at about the center point of the indicator key head.

10. The device of claim 6, wherein the shank is removable and interchangeable with different sizes.

11. The device of claim 1, wherein an arc of the locating member has a non-specific radius.

12. The device of claim 1, wherein the locating member comprises a wire or metal material.

13. The device of claim 1, wherein a shape of a cross section of the post of the indicator key prevents it from rotating within the body when it is in its fully extended position.

14. The device of claim 1, wherein the indicator key post is mounted to a main body through a hinge joint adapted to allow the indicator key to be pivoted horizontally or vertically when in use.

15. The device of claim 1, wherein an alignment pin comprises:
   a straight end that contacts the tip of the locating member when in use; and
   a curved end or an enlarged diameter at a predetermined distance;
   wherein the alignment pin is aligned with the terminal end of the locating member.

16. The device of claim 15, wherein a shape of the alignment pin is adapted to aid in drilling holes through a surface allowing the locating member to be inserted.

17. The device of claim 5, wherein the main body comprises a lip.

18. The device of claim 1, wherein a material of the indicator key allows it to be moved for inserting the locating member through a surface.

19. The device of claim 1, wherein the post of the indicator key has a cylindrical section that allows the indicator key to be rotated for storage when the key is in its retracted position.

20. The device of claim 1, wherein the post is generally parallel to a path of the terminal end of the locating member.

21. The device of claim 5 wherein the locating member and the indicator key are retractable into the body.

22. The device of claim 1 wherein the radius corresponds to a dimension of the hidden structural component.

23. The device of claim 1 wherein the locating member is adapted to be rotated for insertion into an access hole.

24. The device of claim 1 wherein the locating member comprises a plurality of segments.

25. A method for locating a location within a hidden structural component, comprising:
   providing a device to locate a location within a hidden structural component comprising a locating member extending from a proximal end and extending along a generally curved path coplanar to a vertical axis of the device and extending away from the vertical axis to a terminal end of the locating member; and
   an indicator key coupled to the locating member comprising a post and a head coupled to the post, the head comprising an arcuate shape having a radius extending from a center point to a perimeter of the arcuate shape of the head, wherein the terminal end of the locating member and the center point of the indicator key head have a generally coextensive relationship and the radius of the indicator key head extends beyond the terminal end of the locating member to extend beyond an edge of the structural member when the terminal end of the locating member is disposed adjacent to the hidden structural component in use;
   creating, using the device, an access hole generally perpendicular to a surface, near an edge of the hidden structural component;
   inserting the locating member into the access hole;
   extending the indicator key;
   rotating the device in a direction until it stops; and
   marking the location of the hidden structural component using an outer edge of the indicator key head.

26. The method of claim 25, wherein the method further comprises the steps of:
   rotating the device in the opposite direction until it stops;
   using the outer edge of the indicator key to make a second mark corresponding to a second location of the hidden structural component; and
   connecting the two marks to form a line corresponding to approximately a line within the hidden structural component.

27. The method of claim 26 wherein the radius is approximately one-half a width of the hidden structural component and the line corresponds to approximately a center line of the hidden structural component.

28. The method of claim 25, further comprising calibrating the device, wherein the calibrating step comprises the steps of:
   ensuring full vertical extension of the indicator key through the key hole opening of the main body, wherein the second end post is flush against the side of the main body;
   placing the alignment pin through the alignment hole in the indicator key towards the terminal end of the locating member until the second end of the pin is seated against the surface of the indicator key; and
   confirming the tip of the alignment pin is aligned with the terminal end of the locating member.

* * * * *